US011871689B1

(12) United States Patent
Smith et al.

(10) Patent No.: US 11,871,689 B1
(45) Date of Patent: Jan. 16, 2024

(54) TOOL AND TOOL HOLDER FOR A ROTARY LAND PREPARATION IMPLEMENT AND VEHICLE THEREOF

(71) Applicant: Fecon, LLC, Lebanon, OH (US)

(72) Inventors: Tyler Rand Smith, Morrow, OH (US); Jeffrey Thomas Stanley, Lebanon, OH (US); Steven Keith Watson, III, West Chester, OH (US)

(73) Assignee: Fecon, LLC, Lebanon, OH (US)

( * ) Notice: Subject to any disclaimer, the term of this patent is extended or adjusted under 35 U.S.C. 154(b) by 0 days.

(21) Appl. No.: 18/178,439

(22) Filed: Mar. 3, 2023

(51) Int. Cl.
| *A01G 3/00* | (2006.01) |
| *A01B 33/02* | (2006.01) |
| *E02F 9/28* | (2006.01) |
| *A01D 34/44* | (2006.01) |
| *A01D 34/62* | (2006.01) |
| *A01D 75/00* | (2006.01) |

(52) U.S. Cl.
CPC ............ *A01B 33/021* (2013.01); *A01D 34/44* (2013.01); *A01D 34/62* (2013.01); *A01D 75/008* (2013.01); *A01G 3/002* (2013.01); *E02F 9/2866* (2013.01)

(58) Field of Classification Search
CPC ... B02C 18/18; B02C 18/145; B02C 13/2804; A01G 3/002; E02F 5/30; E02F 5/305; E02F 9/2866; A01B 9/00; A01B 9/003; A01B 33/02; A01B 33/021; A01B 33/10; A01B 33/103; A01B 33/12; A01B 33/14; A01B 33/142; A01B 35/28
USPC .......................................................... 37/301
See application file for complete search history.

(56) References Cited

U.S. PATENT DOCUMENTS

| 2,558,107 A * | 6/1951 | Smith .................... B02C 13/28 241/85 |
| 2,874,912 A * | 2/1959 | Sennholtz ........... B02C 13/2804 241/294 |
| 4,259,834 A * | 4/1981 | Lambert ................ A01G 3/002 56/294 |
| 4,343,516 A * | 8/1982 | Aden .................... E21C 35/197 407/46 |
| 4,347,988 A * | 9/1982 | Warren ............... B02C 13/2804 241/300 |
| 4,650,256 A * | 3/1987 | Wetzinger ............... E21C 35/19 403/381 |
| 4,717,083 A * | 1/1988 | Quast .................. B02C 13/2804 241/300 |
| 4,750,396 A * | 6/1988 | Gaddis ................... B23D 61/06 83/839 |
| 4,826,090 A * | 5/1989 | Orphall ............... B02C 13/2804 403/381 |
| 5,100,070 A * | 3/1992 | Montgomery, Sr. ........................ B02C 18/184 241/294 |
| 5,148,616 A * | 9/1992 | Maguina-Larco .... E02F 9/2825 299/103 |
| 6,386,641 B2 * | 5/2002 | Mondy .................. B23K 33/00 403/381 |
| 6,464,157 B1 * | 10/2002 | Balvanz .............. B02C 13/2804 241/300 |

(Continued)

*Primary Examiner* — Adam J Behrens
(74) *Attorney, Agent, or Firm* — Frost Brown Todd LLP

(57) ABSTRACT

A land preparation implement includes a rotatable drum assembly that includes a tool assembly. The tool assembly includes a tool holder and a tool. The tool includes a plurality of cleats. The tool holder includes a plurality of cleat supports. The cleats and the cleat supports cooperate to facilitate releasable coupling of the tool to the tool holder.

18 Claims, 31 Drawing Sheets

(56) References Cited

U.S. PATENT DOCUMENTS

| | | | | |
|---|---|---|---|---|
| 7,293,729 | B2* | 11/2007 | Ragnarsson | B02C 18/145 |
| | | | | 241/300 |
| 7,938,350 | B2* | 5/2011 | Doppstadt | B02C 18/145 |
| | | | | 241/294 |
| 8,167,225 | B2* | 5/2012 | Gaudreault | B23C 5/2239 |
| | | | | 241/101.77 |
| 8,540,033 | B2* | 9/2013 | Stanley | A01B 33/142 |
| | | | | 172/548 |
| 8,550,391 | B2* | 10/2013 | Denis | B02C 18/184 |
| | | | | 241/294 |
| D699,269 | S* | 2/2014 | Whittaker | D15/29 |
| 9,561,551 | B2* | 2/2017 | Diego | B02C 18/18 |
| 10,201,130 | B2* | 2/2019 | Stanley | A01G 3/002 |
| 10,335,798 | B2* | 7/2019 | Fredsall | B02C 18/145 |
| 10,758,915 | B2* | 9/2020 | Davis | B02C 18/18 |
| 10,953,406 | B2* | 3/2021 | Denis | B02C 18/18 |
| 2005/0098331 | A1* | 5/2005 | Edwards | E02F 3/241 |
| | | | | 172/701.3 |
| 2006/0272183 | A1* | 12/2006 | Kergen | A01B 33/12 |
| | | | | 37/301 |
| 2008/0283257 | A1* | 11/2008 | Edwards | A01B 33/103 |
| | | | | 172/256 |
| 2017/0079219 | A1* | 3/2017 | Stanley | B02C 18/145 |
| 2017/0259271 | A1* | 9/2017 | Noël | B02C 13/2804 |
| 2018/0235144 | A1* | 8/2018 | Pentesco | B02C 13/30 |

* cited by examiner

TOOL AND TOOL HOLDER FOR A ROTARY LAND PREPARATION IMPLEMENT AND VEHICLE THEREOF

TECHNICAL FIELD

A tool and a tool holder is provided for rotary land preparation implements, such as cutting, grinding, mulching, and/or shredding tools. The tool has a plurality of cleats and the tool holder cleat supports that facilitate releasable coupling therebetween.

BACKGROUND

Land preparation and clearing machines, such as forestry mulchers and land clearing equipment, can be utilized for vegetation management, clearing land, creating paths, and otherwise removing debris, brush, trees, vegetation, soil, concrete, asphalt, rock, and/or other materials, making the land suitable for further development or use. To carry out these tasks, such machines can include a land preparation implement operable to mulch, cut, shred, and/or grind vegetation, brush, trees, stumps, soil, concrete, asphalt, rock, and other materials.

The land preparation implement can be integrally or releasably attached to a vehicle such as a tractor or skid steer, for example, to facilitate articulation and movement of the implement with respect to the vegetation. Often, the vehicle may be a multi-purpose vehicle having the capability to be fitted with any of a variety of implements suitable for other tasks.

BRIEF DESCRIPTION OF THE DRAWINGS

Various embodiments will become better understood with regard to the following description, appended claims and accompanying drawings wherein:

DETAILED DESCRIPTION

The present disclosure is generally directed to land preparation and clearing machines ("land preparation machines") and their corresponding implements that are generally designed to cut, grind, mulch, shred, clear, mill, and/or mix trees, brush, ground cover, vegetation, debris, asphalt, concrete, and/or soil. The land preparation machines and their corresponding implements can comprise a variety of vehicles, including but not limited to skid steer vehicles, forestry machines and vehicles, PTO tractors, farm tractors, and/or any other known vehicles and can have corresponding implements compatible with land preparation and clearing. Such land preparation machines can prepare the surface and subsurface of the earth. As used herein, the phrases "land preparation and clearing" and "land preparation" will mean any land preparation and clearing operations, including but not limited to forestry operations such as cutting, grinding, mulching, shredding, clearing, milling, and/or mixing trees, brush, ground cover, vegetation, debris, soil, rock, asphalt, concrete, and/or soil. As used herein, "feed material" describes trees, brush, ground cover, vegetation, debris, soil, rock, asphalt, concrete, and/or soil produced from such land preparation and clearing operations, including but not limited to forestry operations such as clearing land, cutting and/or mulching trees, and/or preparing land surfaces (e.g., creating paths).

Figure 1:
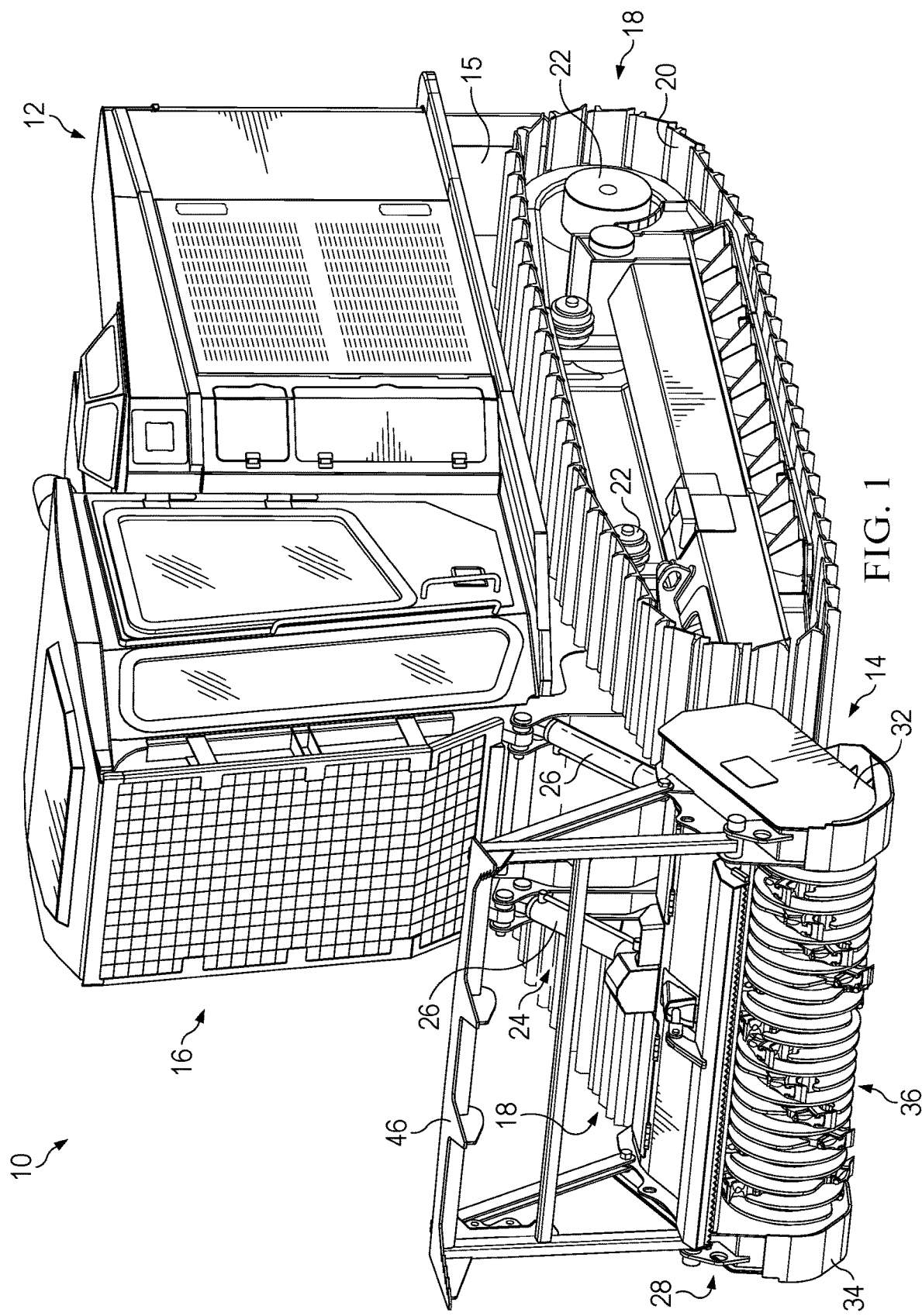
FIG. 1 is a side isometric view depicting a vehicle that includes a rotary land preparation implement having a rotatable drum assembly.
Figure 2:
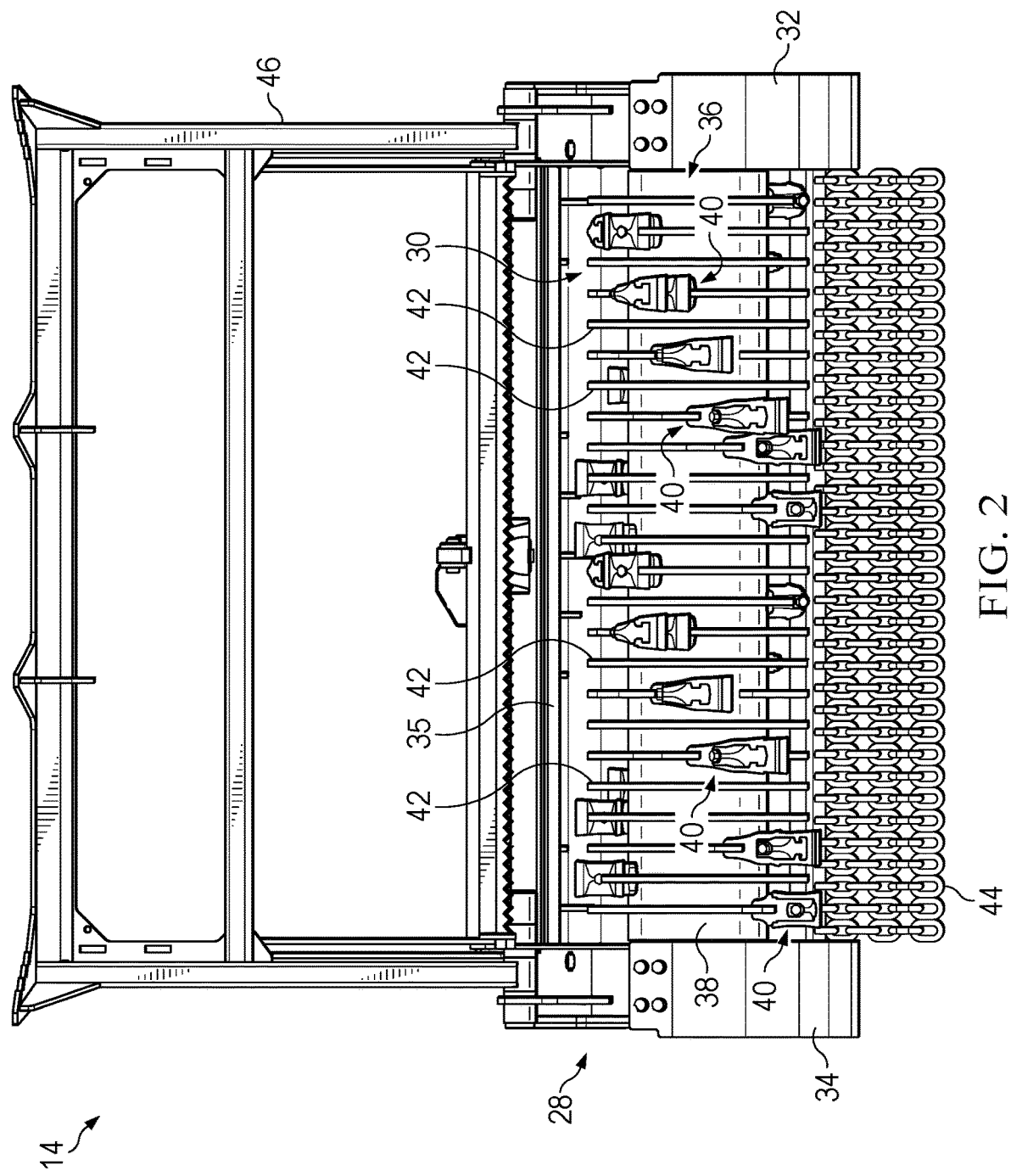
FIG. 2 is front view of the vehicle of FIG. 1.

In connection with the views and examples of FIGS. 1-31, wherein like numbers indicate the same or corresponding elements throughout the views, FIGS. 1 and 2 illustrate a land preparation machine 10 that can include a vehicle 12 (e.g., a forestry vehicle) and a land preparation implement 14 attached to the vehicle 12. In this illustrative embodiment, the vehicle 12 is a skid steer vehicle suitable for off-road travel, and includes a body 15 that includes a passenger compartment 16 as well as a pair of track assemblies 18 that each include a track 20 that is routed around, and driven by, track drive wheels 22 that are rotatably coupled with the body 15. In an alternative embodiment, the vehicle 12 can include tires that may or may not accommodate all-terrain tracks. The vehicle 12 can also include a lift assembly 24 for vertically positioning the land preparation implement 14. The lift assembly 24 can include one or more lift arms 26 that are coupled with the land preparation implement 14 and can be hydraulically powered or electrically powered. Controls (not shown) can be provided to control of the lift assembly 24, including the lift arms 26 as well as for controlling the operation of the wheel assembly 18 and the land preparation implement 14.

While the vehicle 12 is shown to be a skid steer vehicle, other suitable vehicles with capability for powering and utilizing a hydraulic motor attachment or tool (e.g., such as land preparation implement 14) are contemplated, such as other forestry vehicles, mini-track loaders, excavators, backhoes, PTO tractors, farm tractors, and/or any other known vehicles and their corresponding implements compatible with land preparation and clearing. Further examples of suitable skid steer vehicles are shown and described in U.S. Pat. Nos. 4,168,757 and 4,209,071, the entire disclosures of which are hereby incorporated by reference herein. In some embodiments, the vehicle 12 can be controlled remotely or through an autonomous control system.

The land preparation implement 14 can be removably connectable to the lift arms 26. The connection between the land preparation implement 14 (or any other attachment) and the lift arms 26 can be accomplished in any of a variety of manners. For example, receptacles (not shown) can be provided on a rear portion of the land preparation implement 14 to facilitate a connection with the lift arms 26 from the vehicle 12. In particular, such flanges and/or other rear portions of the land preparation implement 14 may define one or more bolt holes for receiving connector bolts (not shown). In certain embodiments, the land preparation implement 14 can include a hydraulic supply connection for receiving an operating supply of hydraulic fluid from a pump within the vehicle to power the land preparation implement 14, and a hydraulic return connection for returning hydraulic fluid to a tank within the vehicle 12. The hydraulic supply and return connections may comprise conventional quick-disconnect connections as known to one of ordinary skill in the art. In such embodiments, a hydraulic cooler may be provided to maintain the supply of hydraulic fluid at a desired temperature and viscosity. In such embodiments, the hydraulic cooler may be mounted to the vehicle 12.

It can be understood that, in certain embodiments, the land preparation implement 14 may be fixedly attached to the vehicle 12. However, it will be appreciated that in certain embodiments, a land preparation implement may be a stand-alone machine, such as a walk-behind land preparation implement. Also, it is understood that other hydraulically-operated rotary mowing or cutting attachments may be utilized with principles of one or more of the embodiments shown and described herein, integral with or detachable from vehicle 12, and/or separately from or in combination with the land preparation implement 14. Other configurations are also possible, such as, for example, where the fluid pump and tank are located at other locations. Connection, powering, and movement of the land preparation implement 14 can be accomplished with various configurations, such as those described in U.S. Pat. Nos. 4,148,366, and 5,813,792, for example, which are hereby incorporated herein by reference.

Still referring to FIGS. 1 and 2, the land preparation implement 14 can include a housing 28 having right and left end caps 32, 34, respectively, but it will be appreciated that other types of first and second ends may be provided. As illustrated in FIG. 2, the housing 28 can further include a framework 35 that can extend between and be connected to each of the right and left end caps 32, 34. The land preparation implement 14 may further include a rotatable drum assembly 36 movably (e.g., rotatably) connected to and between the right and left end caps 32, 34 within a chamber 30. In some embodiments, the right and left end caps 32, 34 may be integral with the housing 28. The rotatable drum assembly 36 can define a longitudinal axis and can include a rotatable drum 38. It is to be appreciated that although the rotatable drum 38 is shown to be substantially cylindrical, non-cylindrical rotatable drums are also contemplated.

The rotatable drum assembly 36 can also include a plurality of tool assemblies 40 that are responsible for clearing the feed material in front of the rotatable drum assembly 36. The tool assemblies 40 can be disposed along an outer perimeter of the rotatable drum 38 and longitudinally spaced from each other. The tool assemblies 40 can be arranged in a helical pattern to optimize the performance of the tool assemblies 40 when clearing the feed material. The tool assemblies 40 can comprise any of a variety of suitable cutters, grinders, mixers, and/or tools and any combination thereof for cutting, grinding, mulching, shredding, clearing, milling, and/or mixing the feed material. Examples of various tool assemblies arranged on a rotatable drum are illustrated in U.S. Publication No. 2009/0050341 A1 which is incorporated by reference herein in its entirety.

The rotatable drum assembly 36 can include plurality of depth control rings 42 (FIG. 3) that can be coupled to, and can extend radially outwardly from, the rotatable drum 38. The depth control rings 42 can be longitudinally spaced from each other along the length of the rotatable drum 38. Each depth control ring 42 can be aligned with one of the tool assemblies 40 and can have height that is less than the overall height of the tool assembly 40 that is aligned therewith. The difference in height between the tool assembly 40 and the depth control ring 42 can define a cutting depth for the tool assembly 40. The height of the depth control rings 42 can be selected to achieve a desired cutting depth and is typically between about 20% and about 80% of the overall height of the tool assembly 40, and more specifically can be between about 30% and about 60% of the overall height of the tool assembly 40. Various additional examples of depth control rings are disclosed in U.S. Patent Publication No. 2017/0079219 A1 which is incorporated by reference herein in its entirety.

During operation of the land preparation machine 10 and the land preparation implement 14, the lift arms 26 can be raised and lowered (via the controls) to raise and lower the land preparation implement 14 relative to the feed material being removed by the tool assemblies 40. The housing 28 can also include a plurality of chains 44 held in place by a chain rod (not shown) extending substantially across the width of the housing 28 from the right end cap 32 to left end cap 34, where the chain rod may be retained without welding or tapping.

The land preparation implement 14 can include a guard assembly 46 that extends upwardly from the framework 35 of the housing 28. In certain embodiments, the guard assembly 46 can include a gauge (not shown) that facilitates visual measurements for widths of, for example, trees and other vegetation. For example, in one embodiment, a center of the gauge may have a zero reading and distance markings may be provided in both directions extending laterally therefrom, where the values of such distance markings increase as the distance from the center of the gauge increases. By aligning, for example, trees or other vegetation with the center, a driver or operator can make a real time estimation to determine whether the trees or other vegetation is too large for the land preparation implement 14. The gauge can be applied to the guard assembly 46 by any suitable manner, such as printing distance markings thereon or attaching a separately formed gauge thereto, such that the gauge can be viewable by the driver or operator of the land preparation machine 10.

Figure 3:
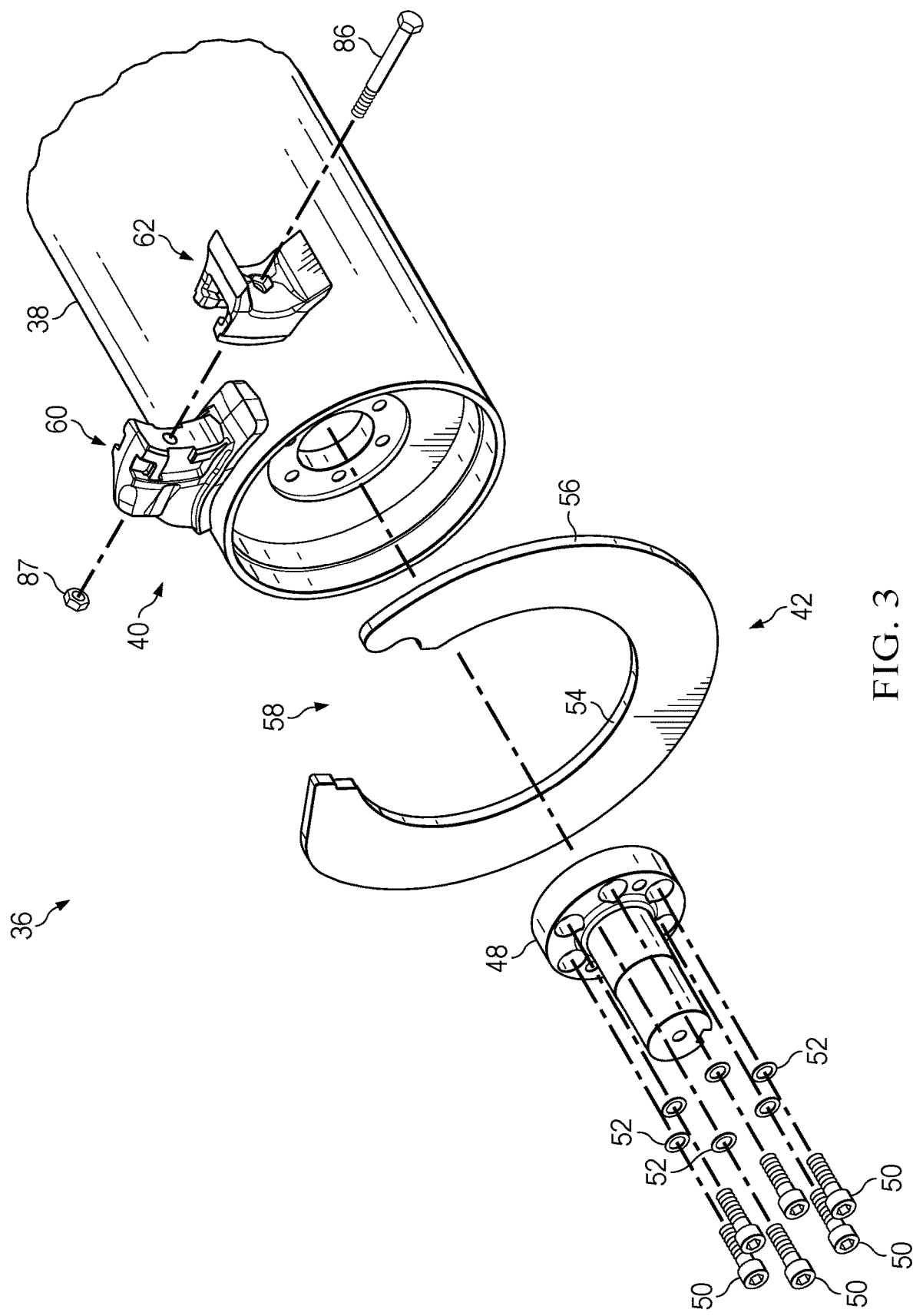
FIG. 3 is a partially exploded cutaway view of the rotatable drum assembly of FIG. 1 with one tool assembly shown associated therewith.

Referring now to FIG. 3, the rotatable drum assembly 36 can include an axle hub 48 that extends longitudinally from one end of the rotatable drum 38. The rotatable drum assembly 36 can include another axle hub (not shown) that is disposed at an opposite end of the rotatable drum 38 and is similar to the axle hub 48 shown in FIG. 3. For purposes of illustration, the axle hub 48 shown in FIG. 3 will now be described but can be understood to be representative of both of the axle hubs (e.g., 48). The axle hub 48 can be releasably coupled to the rotatable drum 38 by a plurality of fasteners 50. A locking washer 52, locking pin, or other suitable mechanism can be used along with one or more of the fasteners 50 to ensure firm securement of the axle hub 48 to the rotatable drum 38.

The rotatable drum assembly 36 can be operably coupled with a motor (not shown), that facilitates selective rotation of the rotatable drum 38. The motor can rotate the rotatable drum 38, and thus the plurality of tool assemblies 40, at an appropriate speed for the land preparation being performed (e.g., at speeds of between about 100 RPM and about 3000 RPM). The motor can be operably coupled with the rotatable drum 38 by a drive belt (not shown) or by being directly connected to the rotatable drum 38 or one of the axle hubs 48. In one embodiment, the motor can be a hydraulic motor, such as a hydraulic piston motor. In another embodiment, the motor can be an electrically driven motor. It is to be appreciated that the motor can be any of a variety of suitable alternative motors that facilitate operation of the rotatable drum 38. Various examples of hydraulically driven land preparation machinery are disclosed U.S. Patent Publication No. 2006/0032222 which is incorporated by reference herein in its entirety herein.

Still referring to FIG. 3, one of the depth control rings 42 is illustrated and will now be described and can be understood to be representative of the other depth control rings 42 of the rotatable drum assembly 36. The depth control ring 42 can include an inner perimeter 54 and an outer perimeter 56. The height of the depth control ring 42 can be defined as the distance between the inner and outer perimeters 54, 56. The inner perimeter 54 can be coupled to the rotatable drum 38 either through fixed attachment (e.g., welded, epoxied, braised or bonded) or releasable attachment (e.g., with fasteners). The inner perimeter 54 can be contoured in a similar manner as the rotatable drum 38 to facilitate effective mating therebetween when attaching the depth control ring 42 to the rotatable drum 38. The depth control ring 42 can define a slot 58 that can accommodate the tool assembly 40. In an alternative embodiment, the tool assembly 40 can be coupled to the depth control ring 42.

Figure 4:
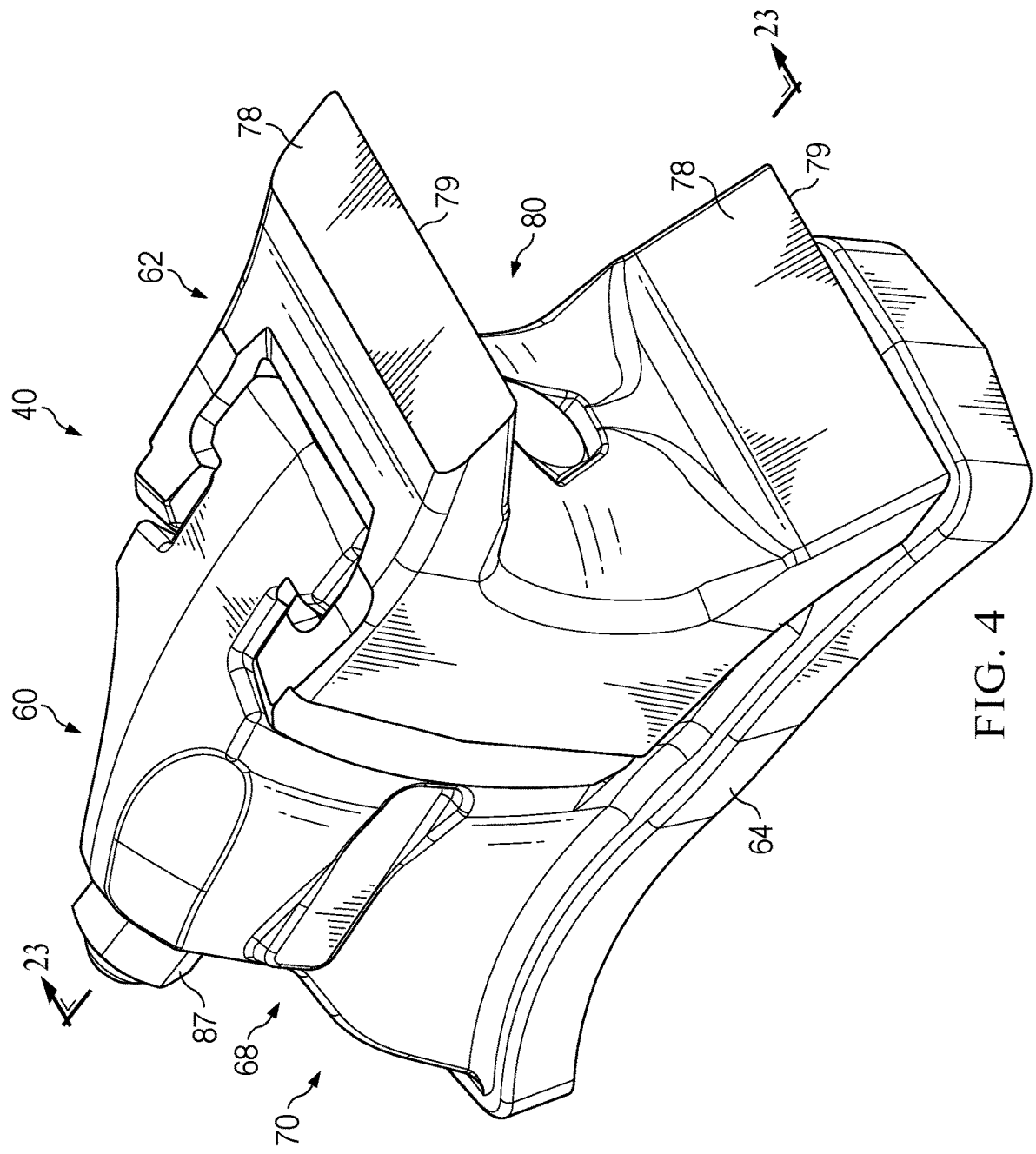
FIG. 4 is a front upper isometric view of the tool assembly of FIG. 3 that includes a tool holder and a tool, in accordance with one embodiment.
Figure 5:
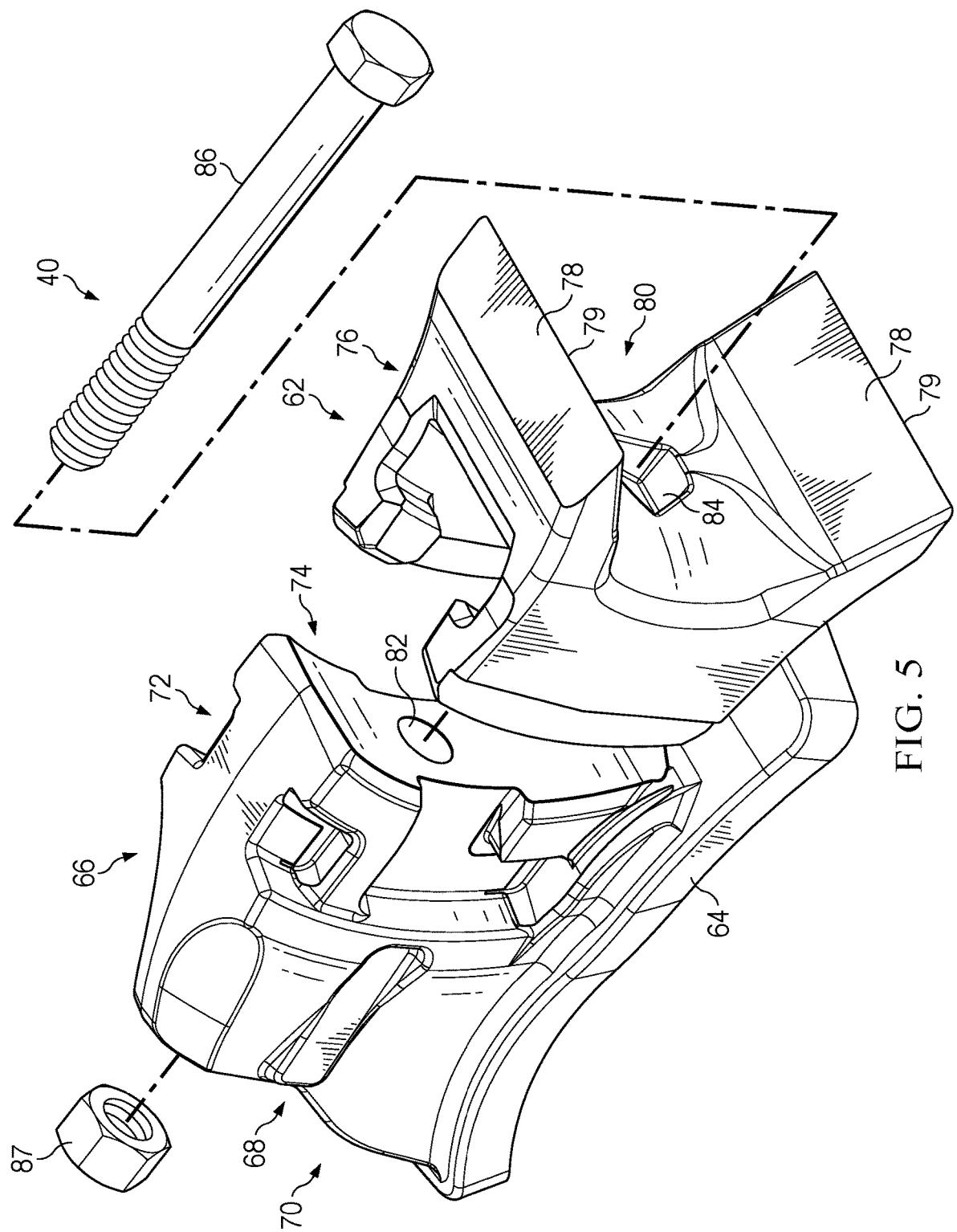
FIG. 5 is an exploded front upper isometric view of the tool assembly of FIG. 4.

Referring now to FIGS. 4-23, one of the tool assemblies 40 is shown and will now be described and can be understood to be representative of other tool assemblies 40 on the rotatable drum 38. As illustrated in FIGS. 4 and 5, the tool assembly 40 can include a tool holder 60 and a land preparation tool 62 (hereinafter "the tool 62") that is releasably coupled with the tool holder 60 such that the tool 62 is selectively attachable thereto. As illustrated in FIG. 5, the tool holder 60 can include a base flange 64 and a main body 66 that extends upwardly from the base flange 64. The main body 66 can include a rear portion 68 disposed at a rear end 70 of the tool holder 60 and a tool interface pillar 72 disposed at a front end 74 of the tool holder 60 and extending from the rear portion 68. The tool holder 60 can be attached to the rotatable drum 38 via the base flange 64. The base flange 64 can be attached via welding, brazing, or any of a variety of suitable alternative attachment methods. The base flange 64 can be contoured to mate appropriately with the rotatable drum 38 for effective attachment thereto. In one embodiment, the tool holder 60 can be formed of a unitary one-piece construction such as through a casting and machining process.

The tool 62 can include a main body 76 and a pair of blades 78 that extend from the main body 76 and have a leading edge 79 that is substantially flat (e.g., an axe configuration). The blades 78 can be disposed at a front end 80 of the tool 62 such that they are available to contact and cut the feed material during rotation of the rotatable drum assembly 36. The blades 78 can be vertically spaced from each other and the tool 62 can be arranged on the tool holder 60 such that one of the blades 78 is higher than the other blade 78. The blade 78 that is located higher on the tool holder 60 can be exposed above the depth control ring 42. During operation of the rotatable drum assembly 36, the blade 78 that is exposed can be primarily responsible for cutting the feed material while the other blade 78 can be encircled by the depth control ring 42 and effectively protected from the feed material. When the blade 78 that is exposed wears out or is otherwise ineffective for cutting, the tool 62 can be removed and rearranged to expose the other blade 78 above the depth control ring 42. It is to be appreciated, that although a pair of blades are shown and described, any of a variety of suitable alternative material engaging features for the tool 62 for land surface preparation and clearing are contemplated, such as for example, one or more of a cutter, blade, grinder, chipper, tooth, knife, hammer tool, milling tool, flailing tool or element, carbide tip, steel tip, or composite tip. It is also to be appreciated that the tool holder 60 and/or the tool 62 can be fabricated from a variety of metals, composites, plastics, or combinations thereof.

Referring again to FIGS. 4 and 5, the main body 66 of the tool holder 60 can define a passageway 82 and the main body 76 of the tool 62 can define a passageway 84. When the tool 62 is attached to the tool holder 60, the passageways 82, 84 can be substantially aligned to accommodate a fastener 86 that secures the tool holder 60 and the tool 62 together. In one embodiment, the passageway 82 can be threaded to allow the fastener 86 to be threadably coupled with the tool holder 60. In another embodiment, a nut (not shown) can be threaded onto the fastener 86 to facilitate securement of the tool holder 60 and the tool 62 together.

Figure 6:
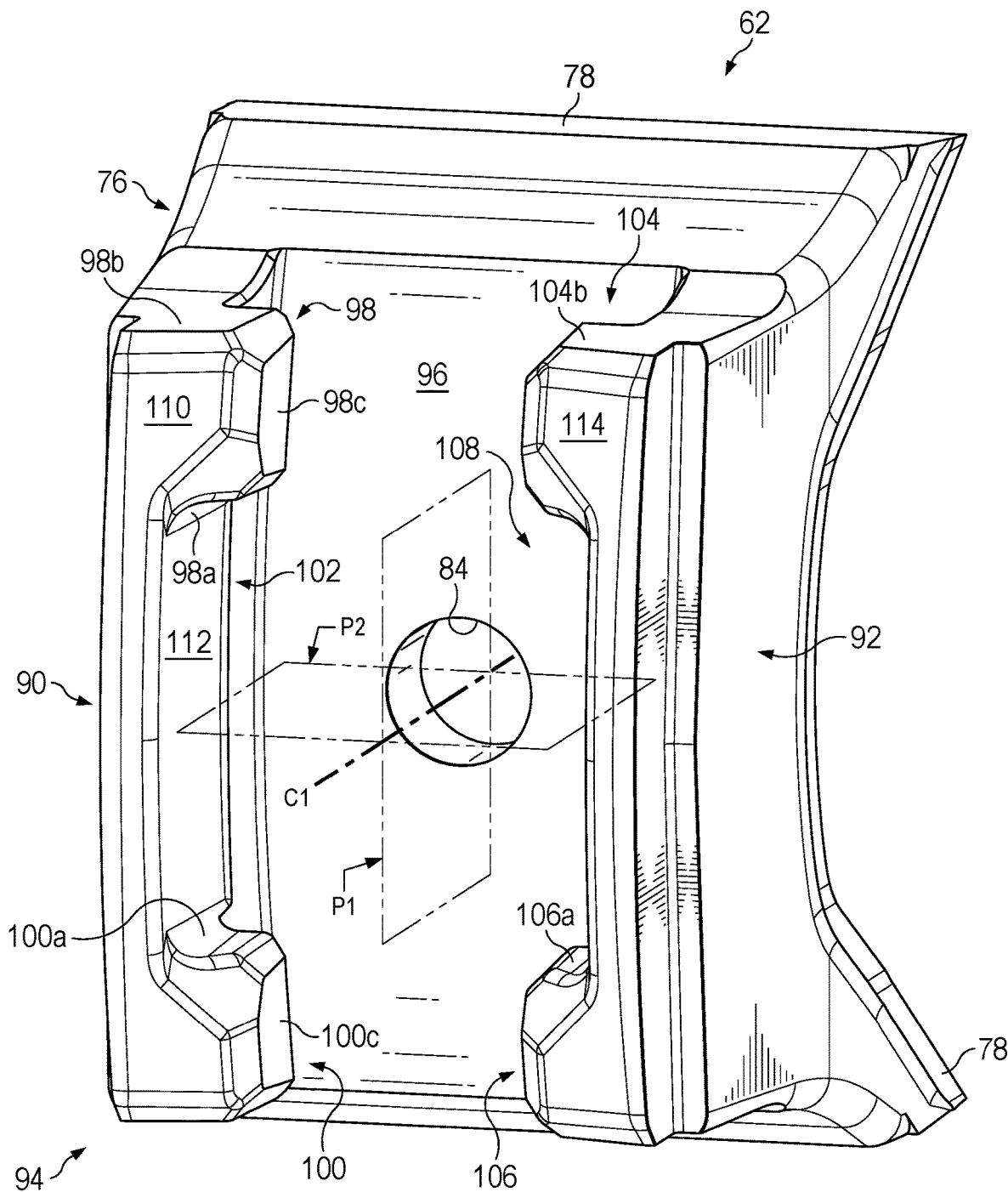
FIG. 6 is a rear upper isometric view of the tool of FIG. 4.
Figure 7:
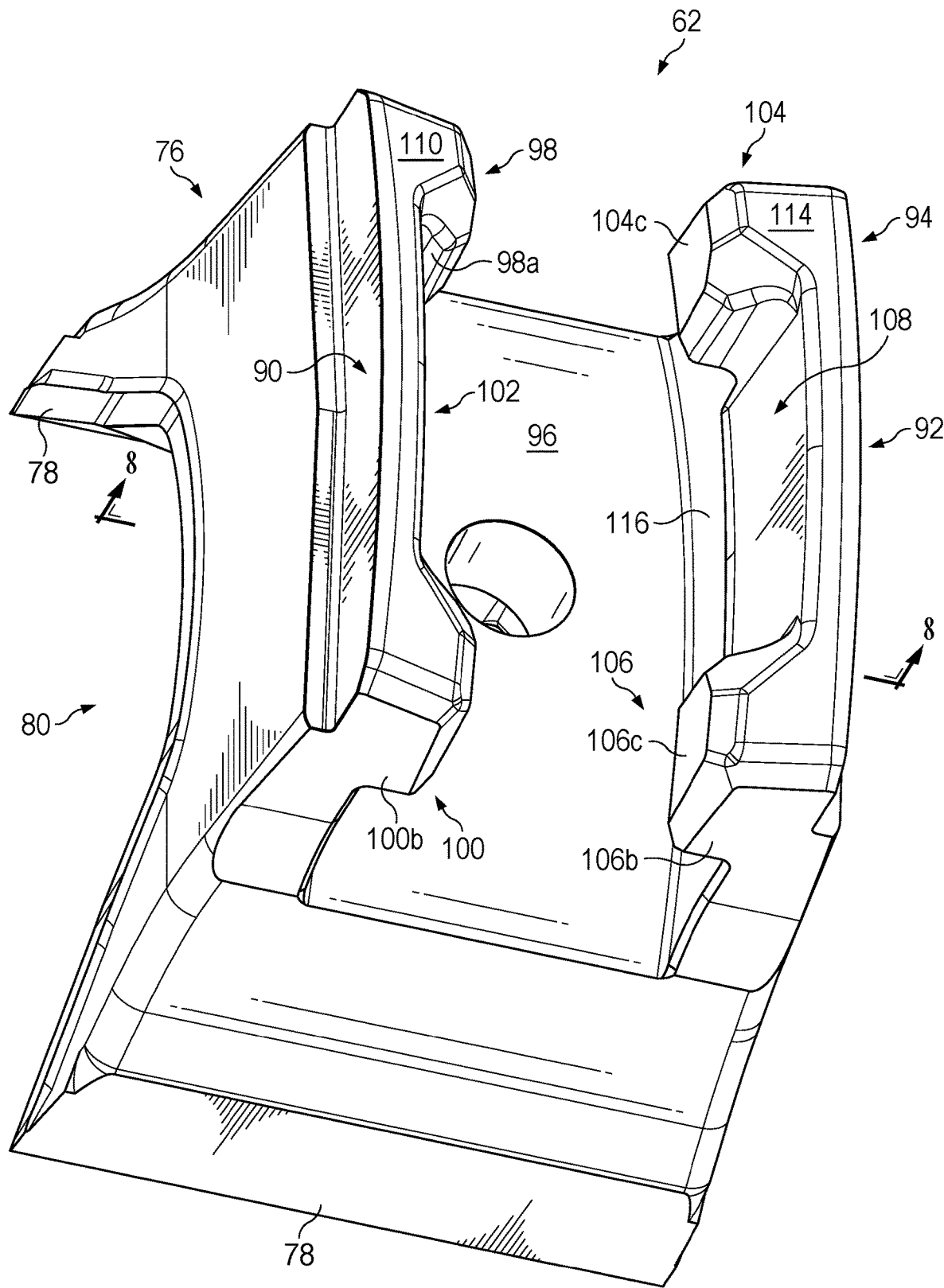
FIG. 7 is a rear lower isometric view of the tool of FIG. 6.

Referring now to FIGS. 6 and 7, the tool 62 can include a first sidewall 90 and a second sidewall 92 that each extend from the main body 76 at a rear end 94 of the tool 62. The first and second sidewalls 90, 92 can be spaced from each other and the main body 76 can include a support surface 96 that extends between the first and second sidewalls 90, 92. A pair of cleats 98, 100 can extend from the first sidewall 90 towards the second sidewall 92 such that the cleats 98, 100 extend laterally inwardly from the first sidewall 90. The cleats 98, 100 can be spaced from each other and the second sidewall 92. The cleats 98, 100 can cooperate with the first sidewall 90 to define a gate 102 therebetween. A pair of cleats 104, 106 can extend from the second sidewall 92 towards the first sidewall 90 such that the cleats 104, 106 extend laterally inwardly from the second sidewall 92. The cleats 104, 106 can be spaced from each other and the first sidewall 90. The cleats 104, 106 can cooperate with the second sidewall 92 to define a gate 108 therebetween. The cleats 98, 100 can be spaced from the cleats 104, 106. As will be described in further below, the cleats 98, 100, 104, 106 can interface with the tool interface pillar 72 of the tool holder 60 to facilitate coupling of the tool 62 to the tool holder 60.

As illustrated in FIG. 6, the passageway 82 can define a centerline C1. The rear end 94 of the tool 62 can be vertically and horizontally symmetrical about the centerline C1 to allow the tool 62 to be installed on the tool holder 60 in two different positions (e.g., selectively inverted) on the same tool holder (e.g., 60). For example, the centerline C1 can reside in an imaginary vertical plane P1 and an imaginary horizontal plane P2. The imaginary vertical plane P1 and the imaginary horizontal plane P2 can be perpendicular to each other such that the centerline C1 resides in both of the imaginary vertical plane P1 and the imaginary horizontal plane P2 (e.g., at the intersection therebetween). The imaginary vertical plane P1 can vertically bisect the tool 62 and the imaginary horizontal plane P2 can horizontally bisect the tool 62. The rear end 94 of the tool 62 can be vertically symmetrical such that the first sidewall 90, the cleats 98, 100, and the support surface 96 disposed on one side of the imaginary vertical plane P1 is a mirror image (e.g., a functional mirror image) of the second sidewall 92, the cleats 104, 106 and the support surface 96 that is disposed on the other side of the imaginary vertical plane P1. The rear end 94 of the tool 62 can be horizontally symmetrical such that the cleats 98, 104 and the portions of the first and second sidewalls 90, 92 and the support surface 96 disposed on one side of the imaginary horizontal plane P2 is a mirror image (e.g., a functional mirror image) of the cleats 100, 106 and the portions of the first and second sidewalls 90, 92 and the support surface 96 disposed on the other side of the imaginary horizontal plane P2.

Referring again to FIGS. 6 and 7, the cleat 98 can include an interior stop surface 98a, an exterior stop surface 98b, and a face surface 98c that is disposed at a distal end of the cleat 98. The interior stop surface 98a and the exterior stop surface 98b can be disposed on opposite sides of the cleat 98 and can extend between the first sidewall 90 and the face surface 98c. The cleat 100 can include an interior stop surface 100a, an exterior stop surface 100b (FIG. 7), and a face surface 100c that is disposed at a distal end of the cleat 100. The interior stop surface 100a and the exterior stop surface 100b can be disposed on opposite sides of the cleat 100 and can extend between the first sidewall 90 and the face surface 100c. A rear surface 110 can be disposed at a distal end of the first sidewall 90 and can extend along the cleats 98, 100. The first sidewall 90 can include an interior surface 112 that extends to the support surface 96 adjacent the cleats 98, 100.

The cleat 104 can include an interior stop surface 104a (FIG. 7), an exterior stop surface 104b, and a face surface 104c that is disposed at a distal end of the cleat 104. The interior stop surface 104a and the exterior stop surface 104b can be disposed on opposite sides of the cleat 104 and can extend between the second sidewall 92 and the face surface 104c. The cleat 106 can include an interior stop surface 106a, an exterior stop surface 106b (FIG. 7), and a face surface 106c that is disposed at a distal end of the cleat 106. The interior stop surface 106a and the exterior stop surface 106b can be disposed on opposite sides of the cleat 106 and can extend between the second sidewall 92 and the face surface 106c. A rear surface 114 can be disposed at a distal end of the second sidewall 92 and can extend along the cleats 104, 106. The second sidewall 92 can include an interior surface 116 that extends to the support surface 96 adjacent the cleats 104, 106.

Figure 8:
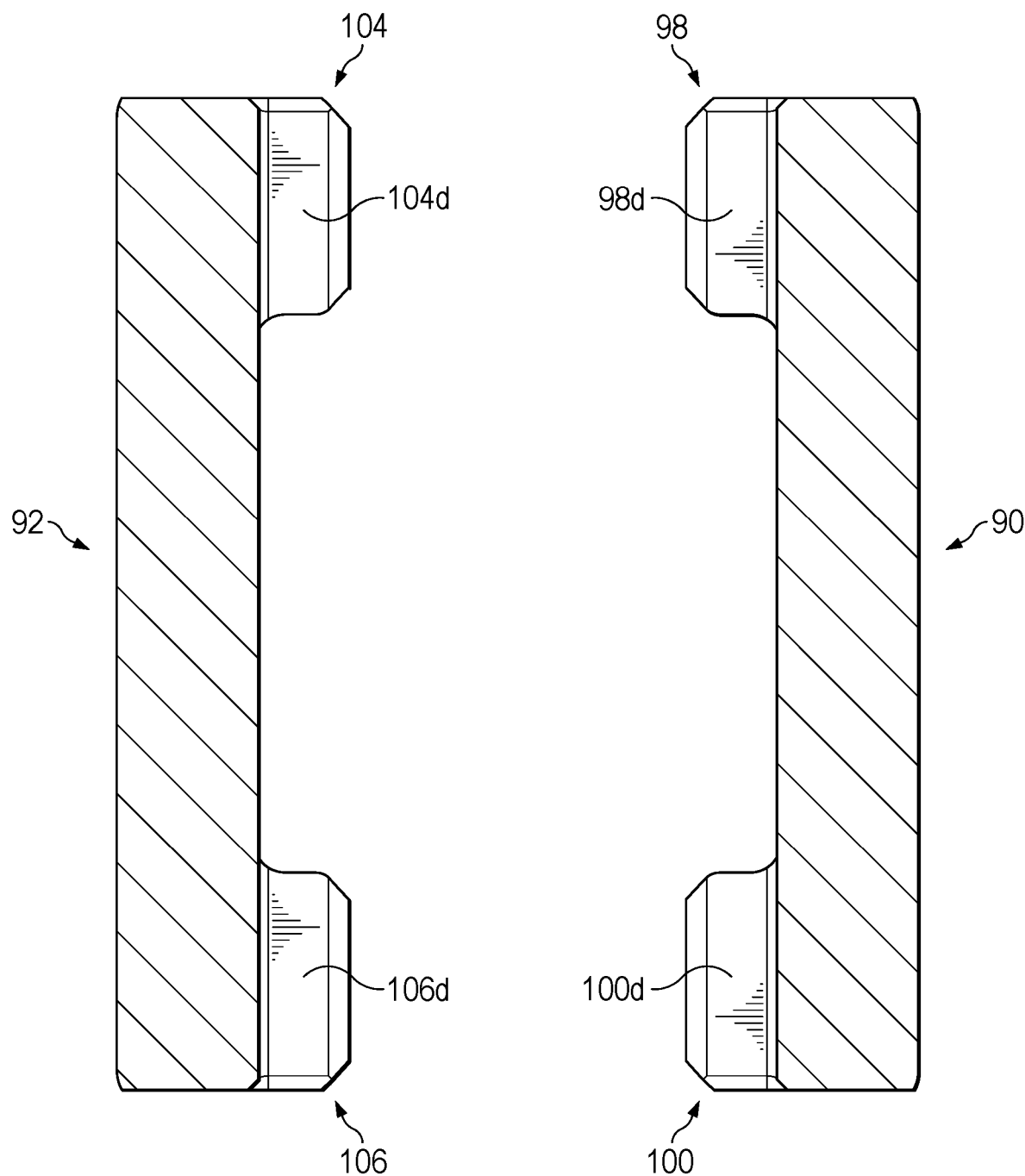
FIG. 8 is a cross sectional view taken along the line 8-8 in FIG. 7.

As illustrated in FIG. 8, the cleats 98, 100, 104, 106 can include front surfaces 98d, 100d, 104d, 106d, respectively. The front surface 98d of the cleat 98 can extend between the interior stop surface 98a, the exterior stop surface 98b, the face surface 98c and the interior surface 112 of the first sidewall 90. The front surface 100d of the cleat 100 can extend between the interior stop surface 100a, the exterior stop surface 100b, the face surface 100c and the interior surface 112 of the first sidewall 90. The front surface 104d of the cleat 104 can extend between the interior stop surface 104a, the exterior stop surface 104b, the face surface 104c and the interior surface 116 of the second sidewall 92. The front surface 106d of the cleat 106 can extend between the interior stop surface 106a, the exterior stop surface 106b, the face surface 106c and the interior surface 116 of the second sidewall 92.

Figure 9:
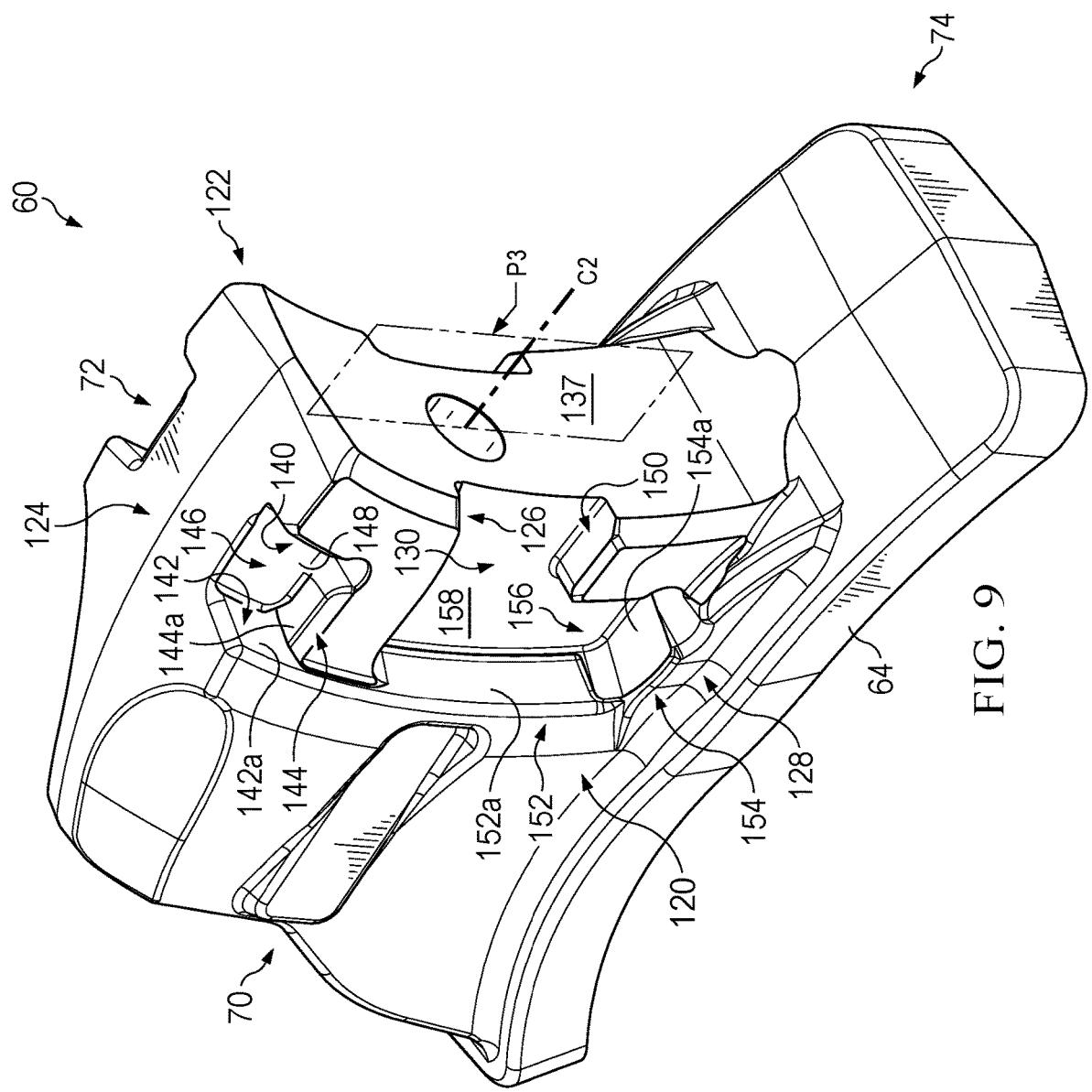
FIG. 9 is a front left upper isometric view of the tool holder of FIG. 4.

Referring now to FIGS. 9-12, the tool interface pillar 72 can include a left side 120 (FIG. 9), a right side 122 (FIG. 10) and a main portion 124 that at least partially defines the passageway 82. As illustrated in FIG. 9, the passageway 82 can define a centerline C2. The centerline C2 can reside in an imaginary vertical plane P3 that extends along the main portion and bisects the tool interface pillar 72 into the left and right sides 120, 122. In order for the tool interface pillar 72 to accommodate attachment of the tool 62 in either position, the left and right sides 120, 122 can be symmetrical about the imaginary vertical plane P3 such that they are substantial mirror images of each other.

Figure 10:
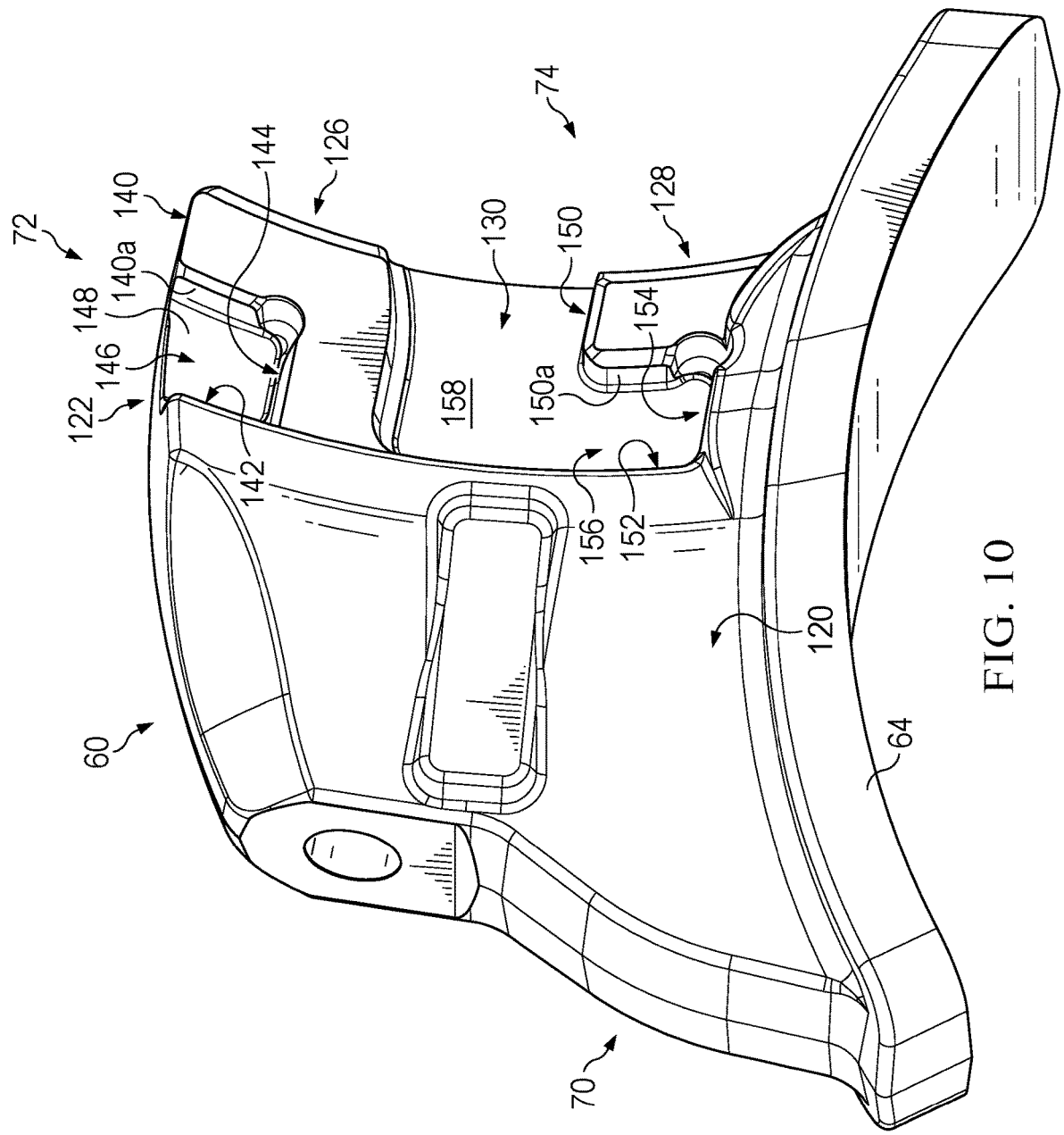
FIG. 10 is a rear left isometric view of the tool holder of FIG. 4.
Figure 11:
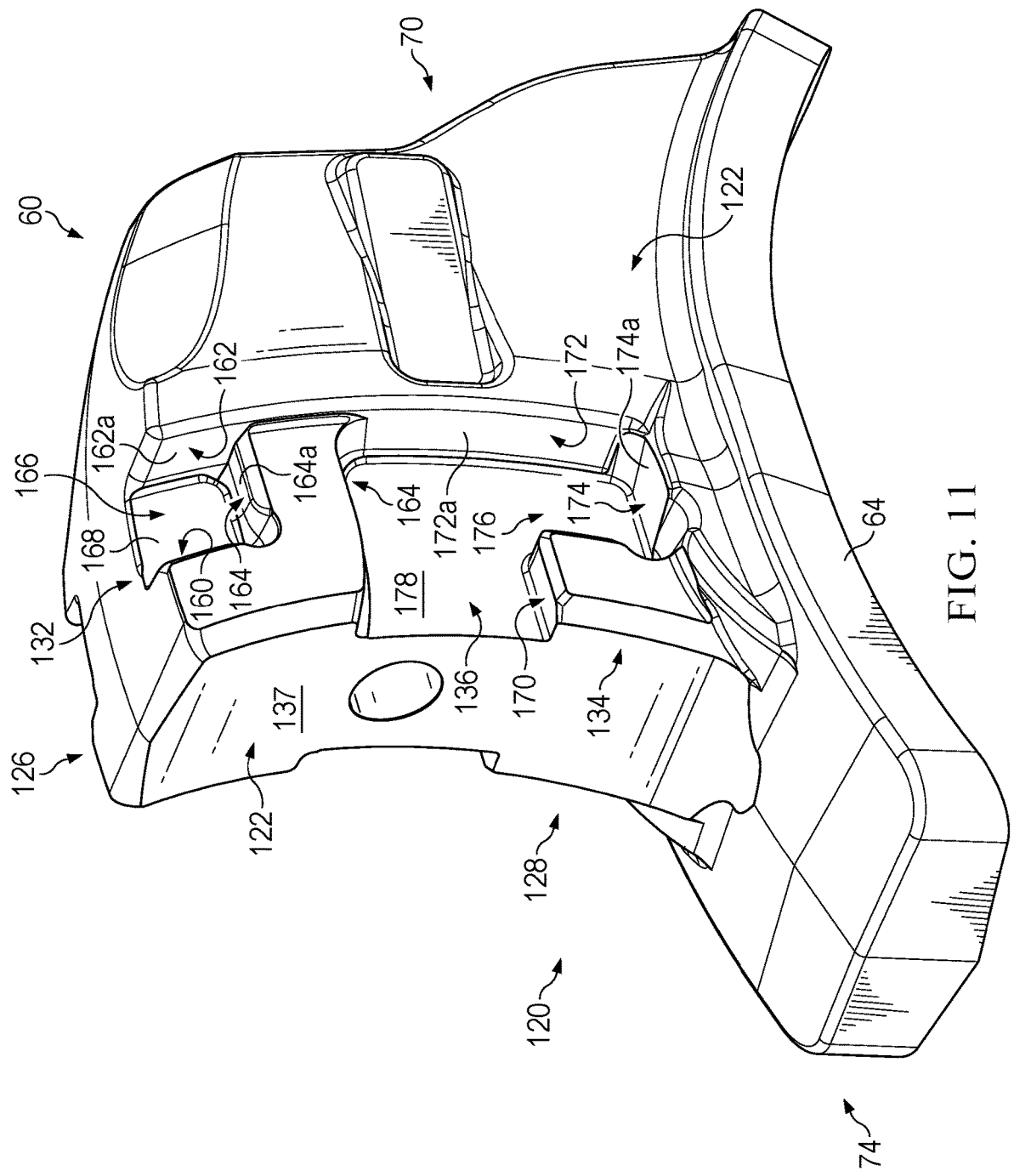
FIG. 11 is a front right upper isometric view of the tool holder of FIG. 4.
Figure 12:
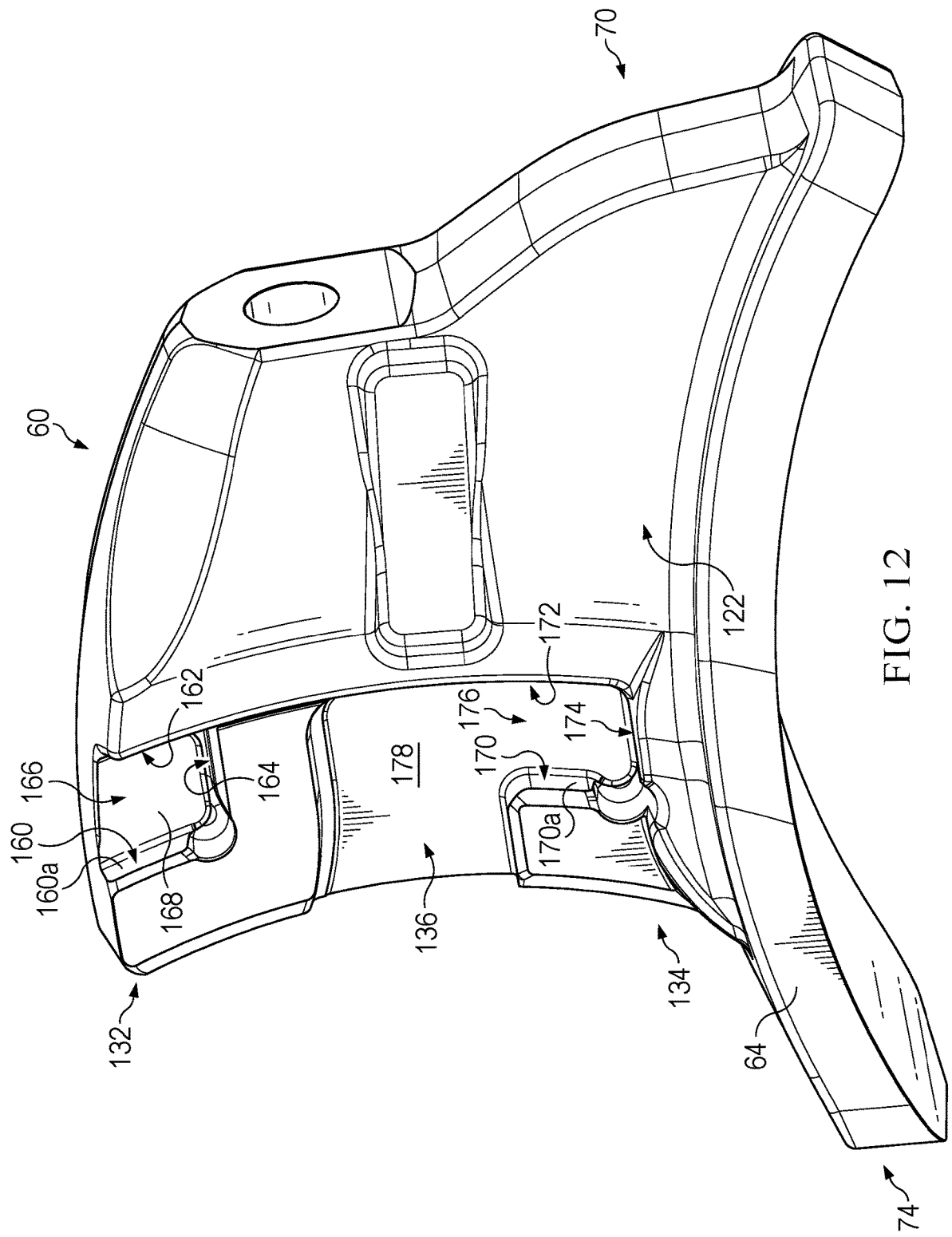
FIG. 12 is a rear right isometric view of the tool holder of FIG. 4.

As illustrated in FIGS. 9 and 10, the tool interface pillar 72 can include an upper cleat support 126 and a lower cleat support 128 that extend laterally outwardly from the main portion 124 on the left side 120 of the tool interface pillar 72. The upper and lower cleat supports 126, 128 can be vertically spaced from each other and can cooperate with the main portion 124 to define a left gate 130. As illustrated in FIGS. 11 and 12, the tool interface pillar 72 can include an upper cleat support 132 and a lower cleat support 134 that extend laterally outwardly from the main portion 124 on the right side 122 of the tool interface pillar 72. The upper and lower cleat supports 132, 134 can be vertically spaced from each other and can cooperate with the main portion 124 to define a right gate 136. The main portion 122 can include a support surface 137 that is disposed at a front end 74 of the tool holder 60. As will be described in further detail below, the upper and lower cleat supports 126, 128, 132, 134 can cooperate with the cleats 98, 100, 104, 106 to facilitate attachment of the tool 62 to the tool holder 60.

Referring again to FIGS. 9 and 10, the upper cleat support 126 can include a front support portion 140, a rear support portion 142, and a lower support portion 144 that extends between the front and rear support portions 140, 142. The front, rear and lower support portions 140, 142, 144 can cooperate with the main portion 124 to define a slot 146 for receiving one of the cleats 100, 104. As illustrated in FIG. 9, the rear support portion 142 can include a rear surface 142*a* and the lower support surface 144 can include a stop surface 144*a*. As illustrated in FIG. 10, the front support portion 140 can include a front surface 140*a*. The stop surface 144*a* can extend between the front and rear surfaces 140*a*, 142*a*. The main support 122 can include a face surface 148 that extends between the front, rear, and stop surfaces 140*a*, 142*a*, 144*a*.

The lower cleat support 128 can include a front support portion 150, a rear support portion 152, and a lower support portion 154 that extends between the front and rear support portions 150, 152. The front, rear and lower support portions 150, 152, 154 can cooperate with the main portion 124 to define a slot 156 for receiving one of the cleats 98, 106. As illustrated in FIG. 9, the rear support portion 152 can include a rear surface 152*a* and the lower support surface 154 can include a stop surface 154*a*. As illustrated in FIG. 10, the front support portion 150 can include a front surface 150*a*. The stop surface 154*a* can extend between the front and rear surfaces 150*a*, 152*a*. The main support 122 can include a face surface 158 that extends between the front, rear, and stop surfaces 150*a*, 152*a*, 154*a*.

Referring now to FIGS. 11 and 12, the upper cleat support 132 can include a front support portion 160, a rear support portion 162, and a lower support portion 164 that extends between the front and rear support portions 160, 162. The front, rear and lower support portions 160, 162, 164 can cooperate with the main portion 124 to define a slot 166 for receiving one of the cleats 98, 106. As illustrated in FIG. 11, the rear support portion 162 can include a rear surface 162*a* and the lower support surface 164 can include a stop surface 164*a*. As illustrated in FIG. 12, the front support portion 160 can include a front surface 160*a*. The stop surface 164*a* can extend between the front and rear surfaces 160*a*, 162*a*. The main support 122 can include a face surface 168 that extends between the front, rear, and stop surfaces 160*a*, 162*a*, 164*a*.

The lower cleat support 134 can include a front support portion 170, a rear support portion 172, and a lower support portion 174 that extends between the front and rear support portions 170, 172. The front, rear and lower support portions 170, 172, 174 can cooperate with the main portion 124 to define a slot 176 for receiving one of the cleats 100, 104. As illustrated in FIG. 11, the rear support portion 172 can include a rear surface 172*a* and the lower support surface 174 can include a stop surface 174*a*. As illustrated in FIG. 12, the front support portion 170 can include a front surface 170*a*. The stop surface 174*a* can extend between the front and rear surfaces 170*a*, 172*a*. The main support 122 can include a face surface 178 that extends between the front, rear, and stop surfaces 170*a*, 172*a*, 174*a*.

Figure 13:
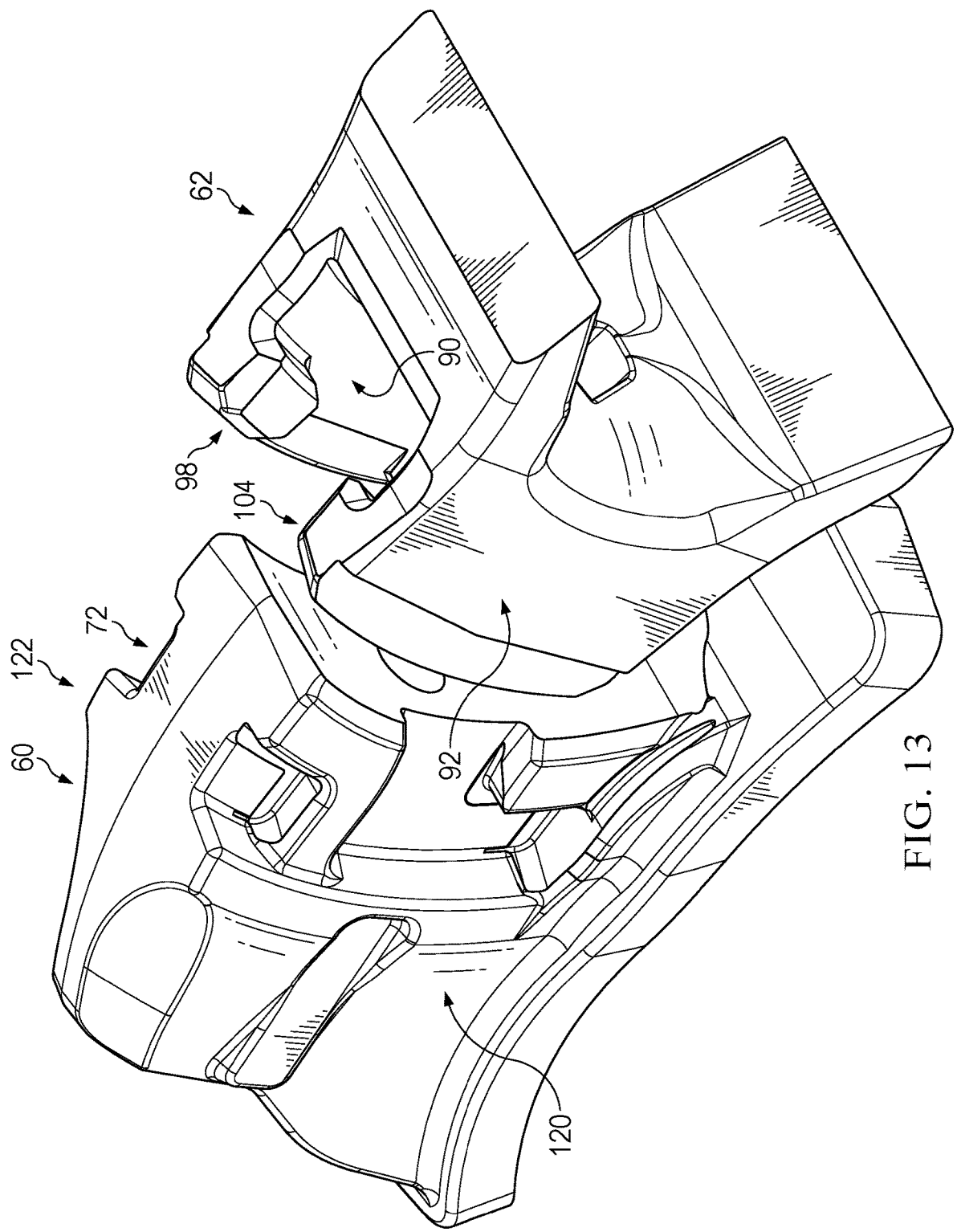
FIG. 13 is a partially exploded isometric view of the tool being installed on the tool holder.
Figure 14:
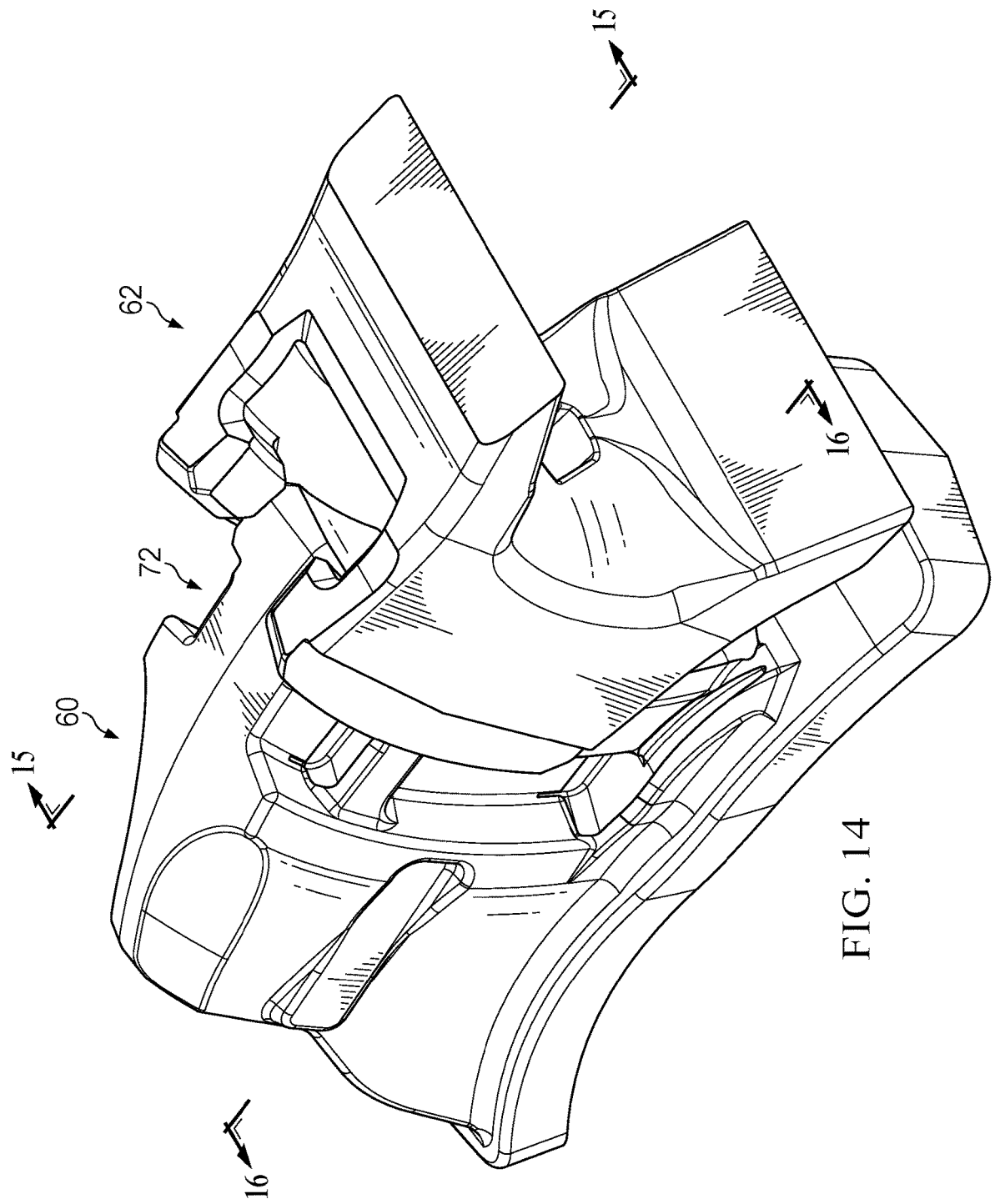
FIG. 14 is a partially exploded isometric view of the tool being further installed on the tool holder relative to FIG. 13.
Figure 15:
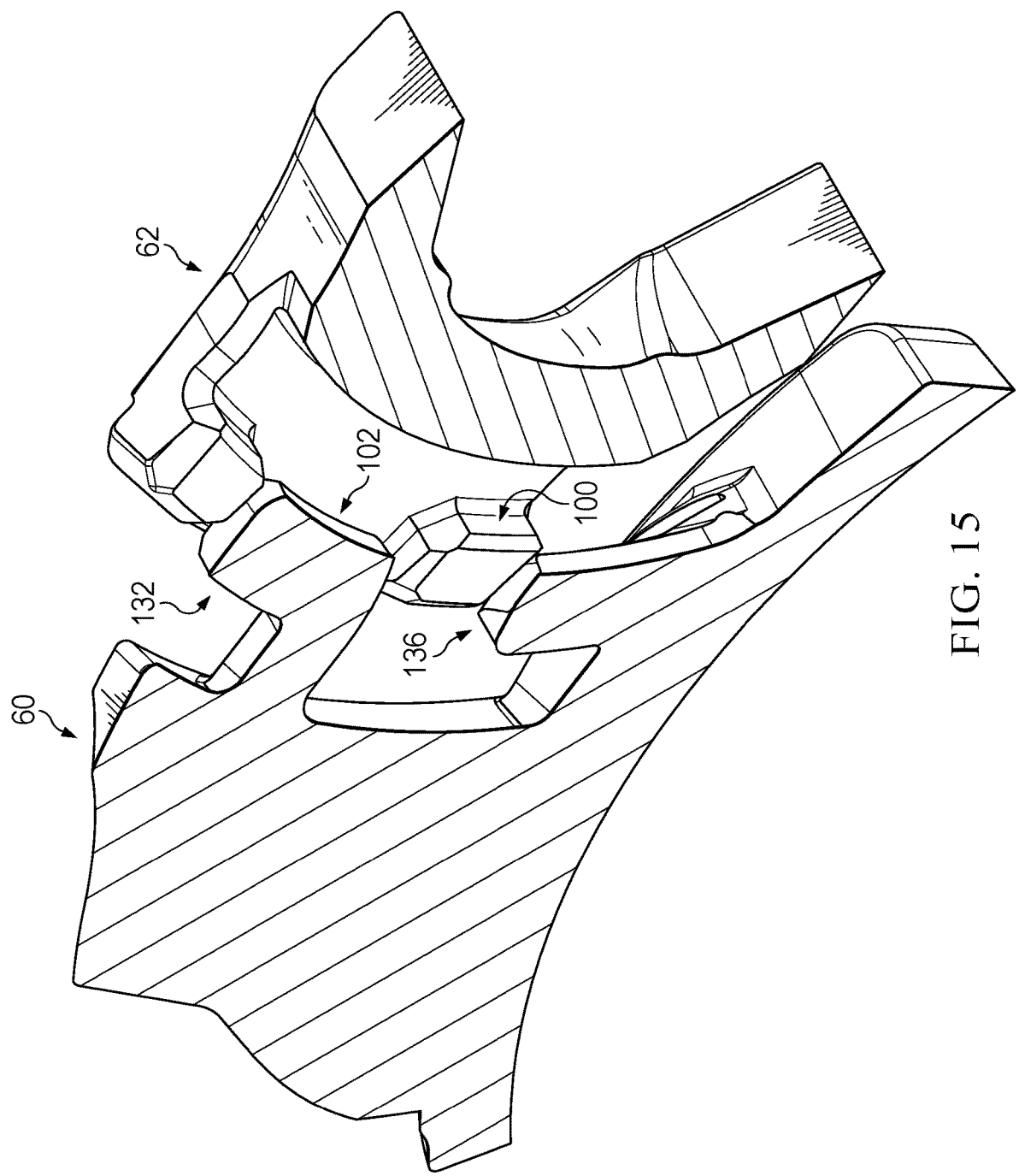
FIG. 15 is a cross sectional view taken along the line 15-15 in FIG. 14.
Figure 16:
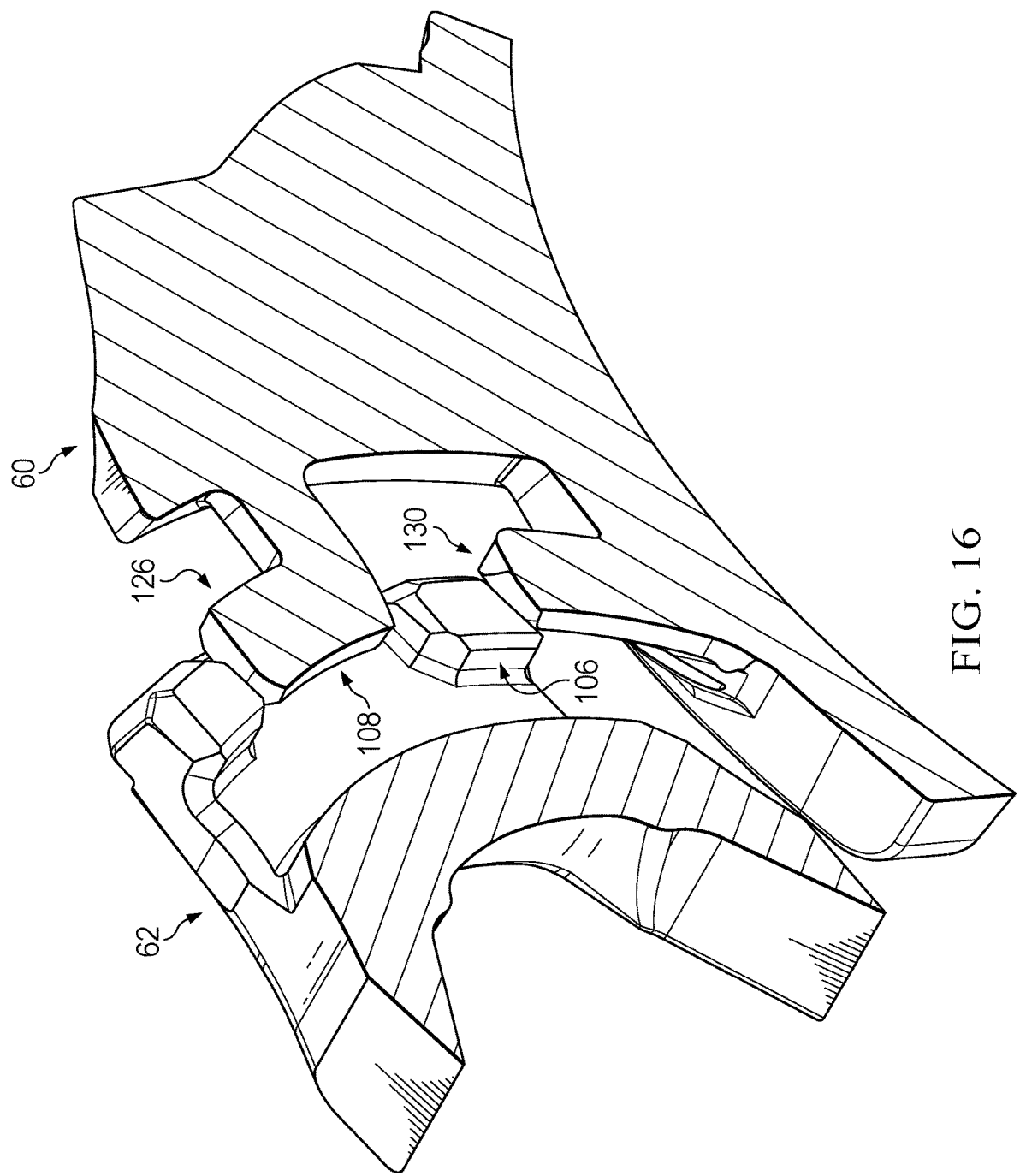
FIG. 16 is a cross sectional view taken along the line 16-16 in FIG. 14.

Referring now to FIGS. 13-16, the installation of the tool 62 onto the tool holder 60 is illustrated and will now be described. First, as illustrated in FIG. 13, the tool 62 can be oriented with the cleats 98, 104 above the cleats 100, 106 such that the first and second sidewalls 90, 92 are to be disposed on the right and left sides 122, 120, respectively, of the tool interface pillar 72. Next, as illustrated in FIGS. 14-16, the tool 62 can be initially fit onto the front of the tool interface pillar 72. As illustrated in FIG. 15, the upper cleat support 132 can be at least partially disposed in the gate 102 of the tool 62 and the cleat 100 can be at least partially disposed in the right gate 136 (FIG. 11) and above the lower cleat support 134 of the tool holder 60. As illustrated in FIG. 16, the upper cleat support 126 can be at least partially disposed in the gate 108 of the tool 62 and the cleat 106 can be at least partially disposed in the left gate 130 (FIG. 9) and above the lower cleat support 128 of the tool holder 60. The gates 102, 108 of the tool 62 and the right and left gates 136, 130 of the tool holder 60 can allow for passage of the upper cleat supports 132, 126 and the cleats 100, 106, respectively to encourage proper alignment of the tool 62 onto the tool holder 60. As the tool 62 is being aligned on the tool holder 60, the face surfaces 100*c*, 106*c* of the cleats 100, 106 can ride along the face surfaces 178, 158 of the main portion 122, the front and lower support portions 150, 154 of the lower cleat support 128 can ride along the interior surface 116 of the second sidewall 92, and the front and lower support portions 170, 174 of the lower cleat support 134 can ride along the interior surface 112 of the first sidewall 90 to further encourage proper alignment of the tool 62 onto the tool holder 60.

Figure 17:
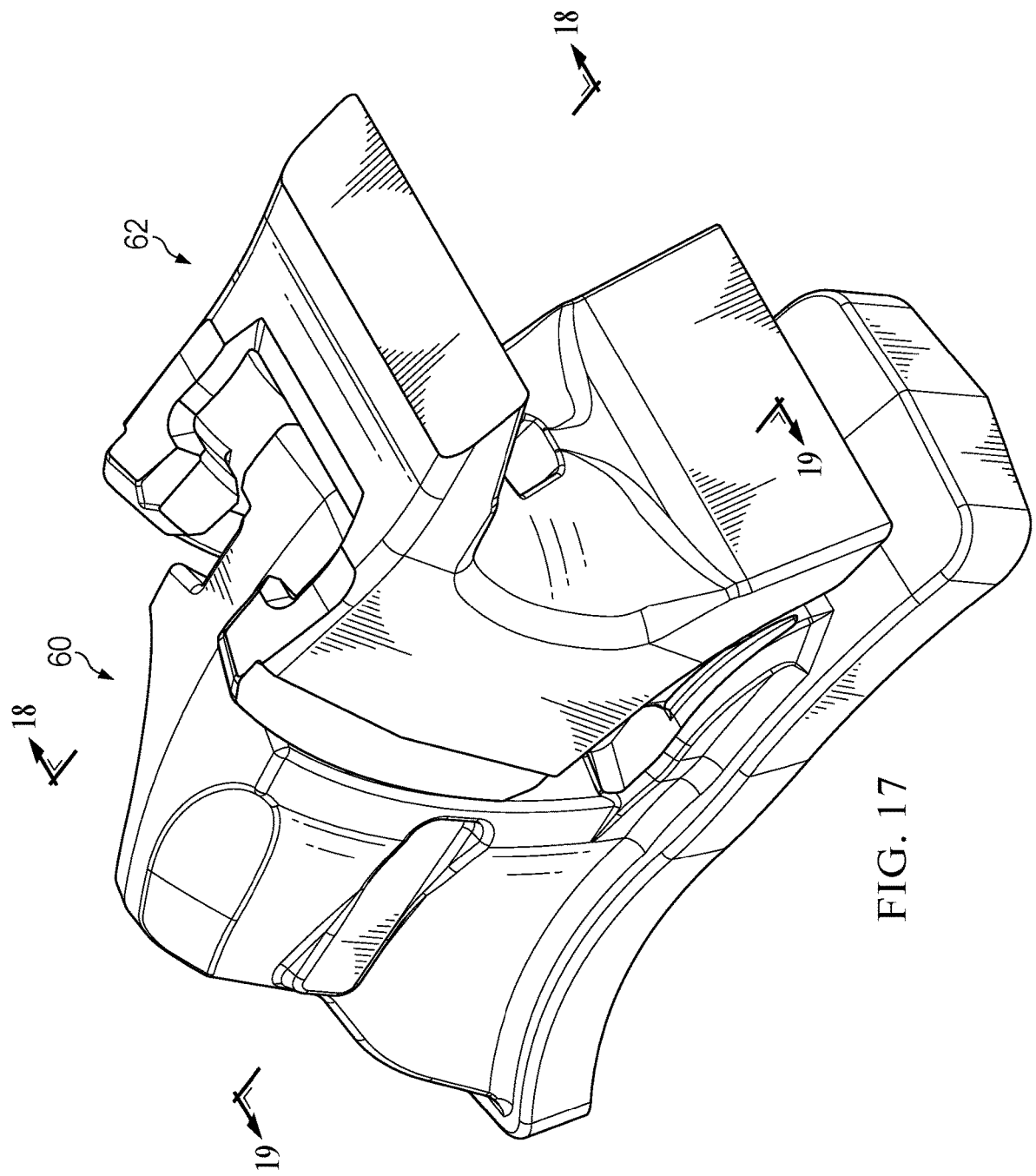
FIG. 17 is a partially exploded isometric view of the tool being further installed on the tool holder relative to FIG. 14.
Figure 18:
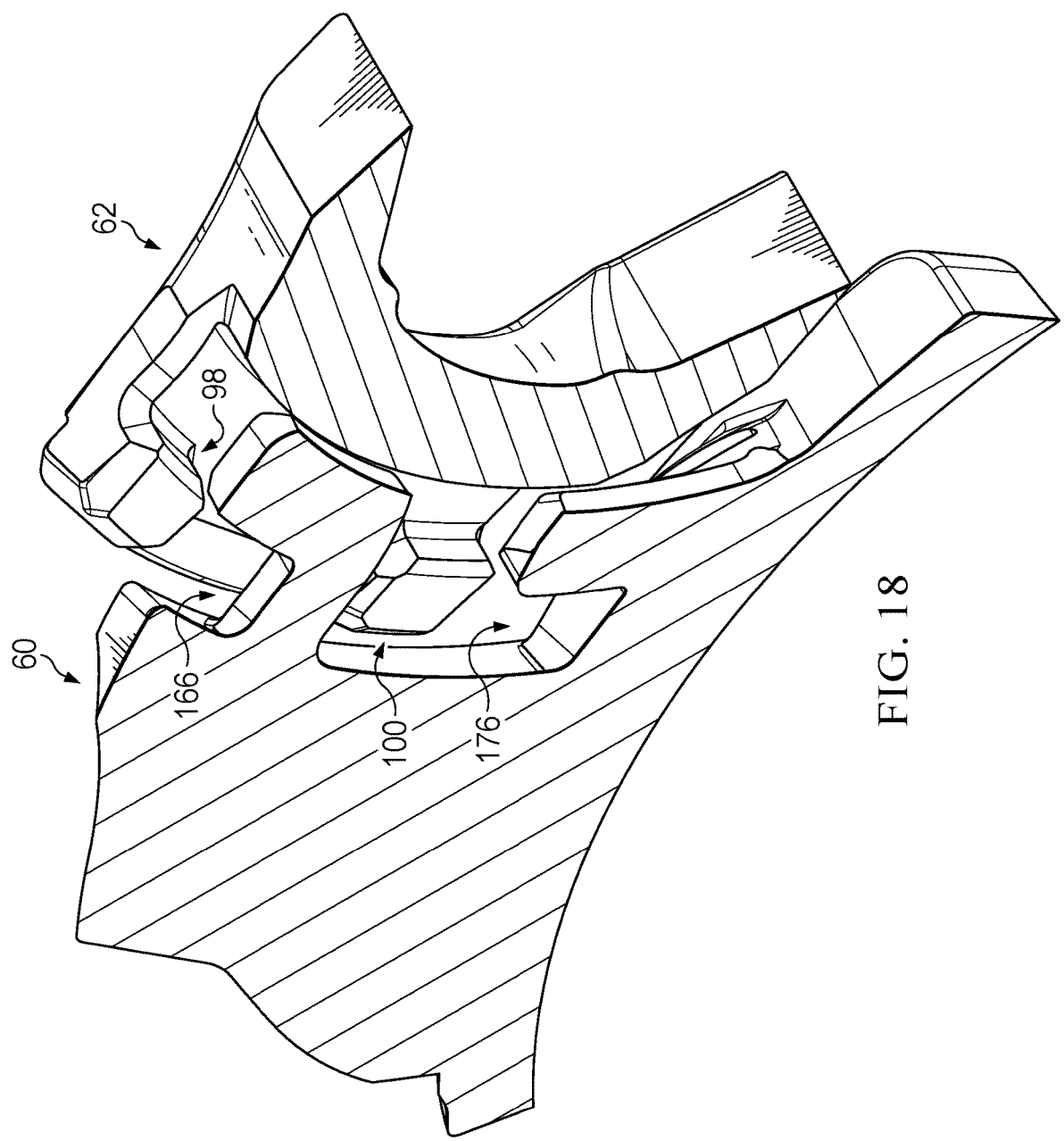
FIG. 18 is a cross sectional view taken along the line 18-18 in FIG. 17.
Figure 19:
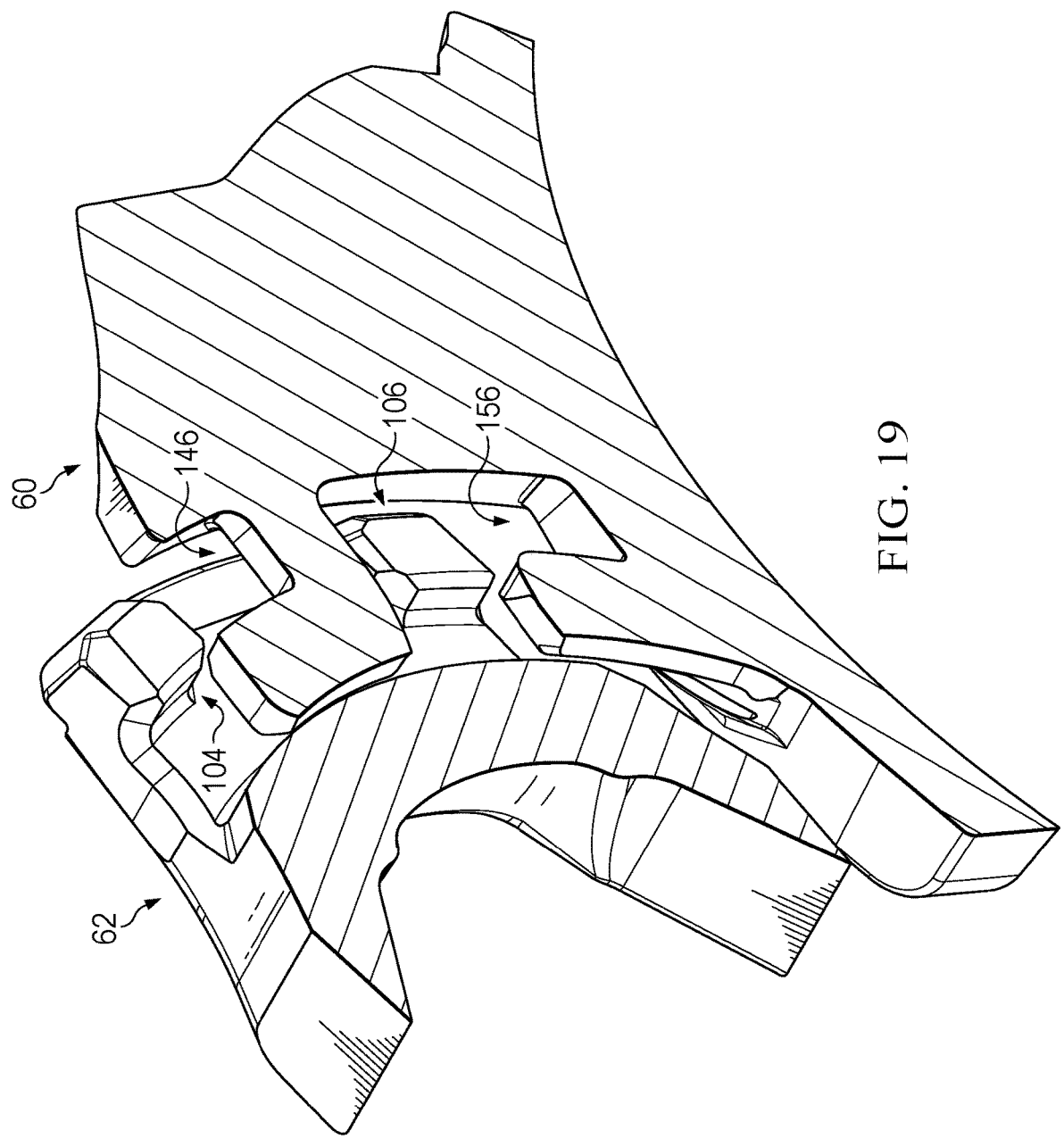
FIG. 19 is a cross sectional view taken along the line 19-19 in FIG. 17.
Figure 20:
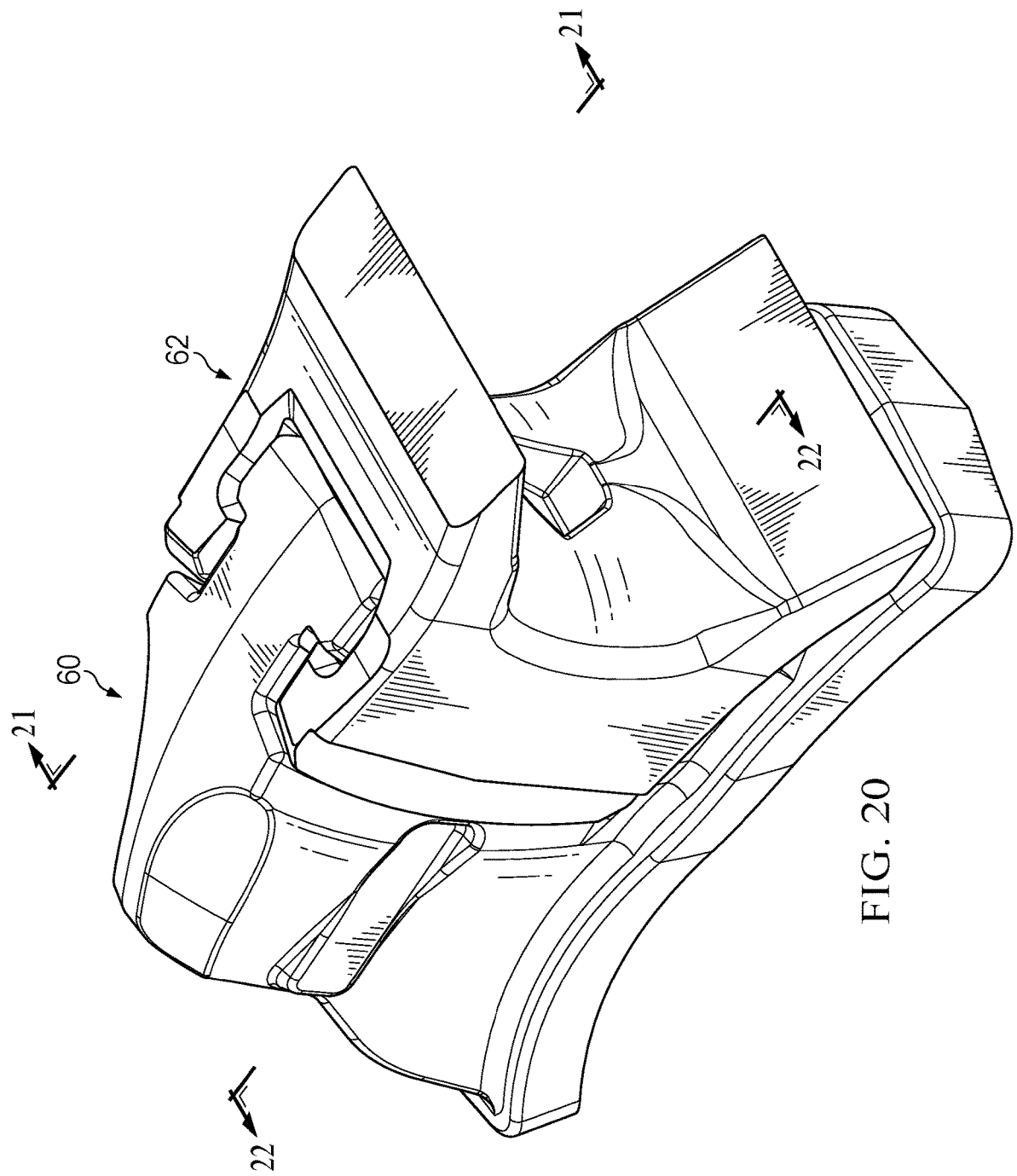
FIG. 20 is an isometric view of the tool installed on the tool holder.
Figure 21:
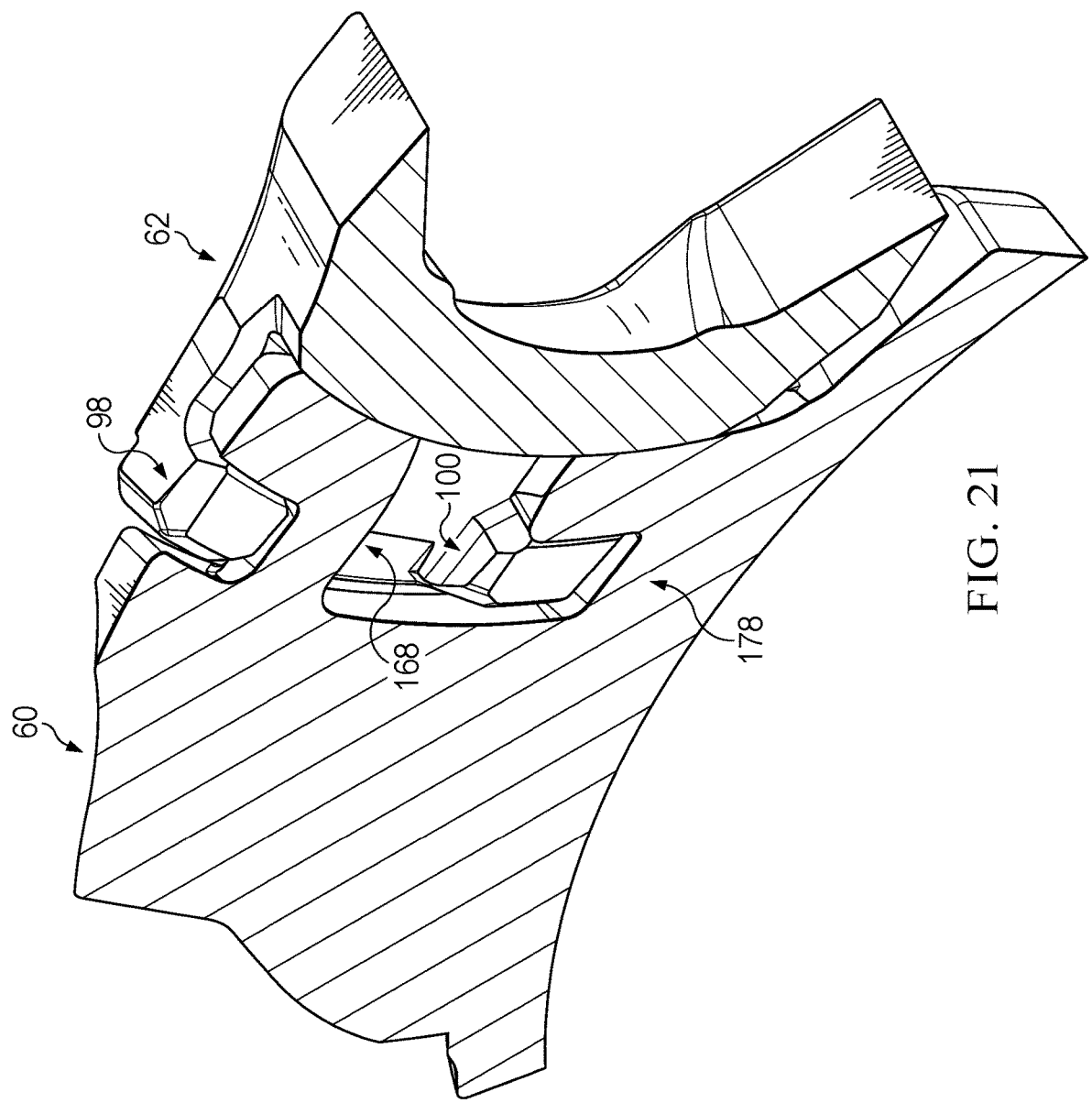
FIG. 21 is a cross sectional view taken along the line 21-21 in FIG. 20.
Figure 22:
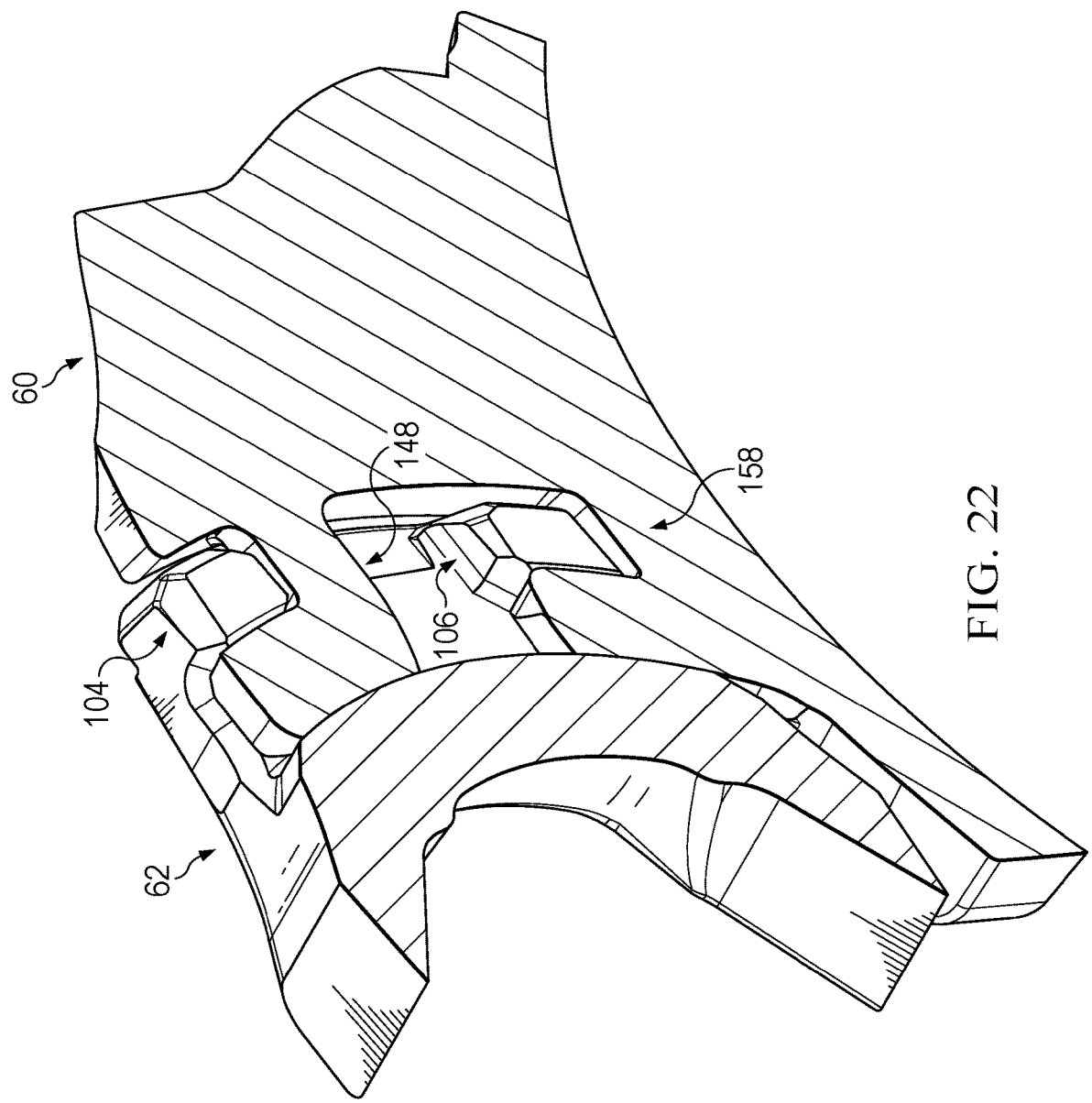
FIG. 22 is a cross sectional view taken along the line 22-22 in FIG. 20.

Next, as illustrated in FIGS. 17-19, the tool 62 can be pushed further onto the tool interface pillar 72 until the support surfaces 96, 137 interface with each other. As illustrated in FIG. 17, the cleats 98, 100 can be disposed above the slots 166, 176 respectively, and the cleats 104, 106 can be disposed above the slots 146, 156, respectively. Next, as illustrated in FIGS. 20-22, the tool 62 can be slid downwardly until the cleats 98, 100 are nested into the upper and lower cleat supports 164, 174 and the cleats 104, 106 are nested into the upper and lower cleat supports 144, 154 such that the tool 62 is fully interlocked with the tool interface pillar 72. With the tool 62 interlocked on the tool holder 60, the front, rear and interior stop surfaces 104*d*, 114, 104*a* of the cleat 104 can be immediately adjacent, and in some embodiments can contact, the front, rear, and stop surfaces 140*a*, 142*a*, 144*a*, respectively, of the upper cleat support 126. The face surface 104*c* of the cleat 104 can be immediately adjacent, and in some embodiments can contact, the face surface 148 of the main portion 122. The front, rear and exterior stop surfaces 106*d*, 114, 106*b* of the cleat 106 can be immediately adjacent, and in some embodiments can contact, the front, rear, and stop surfaces 150*a*, 152*a*, 154*a*, respectively, of the lower cleat support 128. The face surface 106*c* of the cleat 106 can be immediately adjacent, and in some embodiments can contact, the face surface 158 of the main portion 122. The front, rear and interior stop surfaces 98*d*, 110, 98*a* of the cleat 98 can be immediately adjacent, and in some embodiments can contact, the front, rear, and stop surfaces 160*a*, 162*a*, 164*a*, respectively, of the upper cleat support 132. The face surface 98*c* of the cleat 98 can be immediately adjacent, and in some embodiments can contact, the face surface 168 of the main portion 122. The front, rear and exterior stop surfaces 100*d*, 110, 100*b* of the cleat 100 can be immediately adjacent, and in some embodiments can contact, the front, rear, and stop surfaces 170*a*, 172*a*, 174*a*, respectively, of the lower cleat support 134. The face surface 100*c* of the cleat 100 can be immediately adjacent, and in some embodiments can contact, the face surface 178 of the main portion 122. Once the tool 62 is interlocked with the tool interface pillar 72, the fastener 86 can be installed though the passageways 82, 84, to facilitate further securement of the tool 62 to the tool holder 60 thereby completing the installation of the tool 62 on the tool holder 60.

Figure 23:
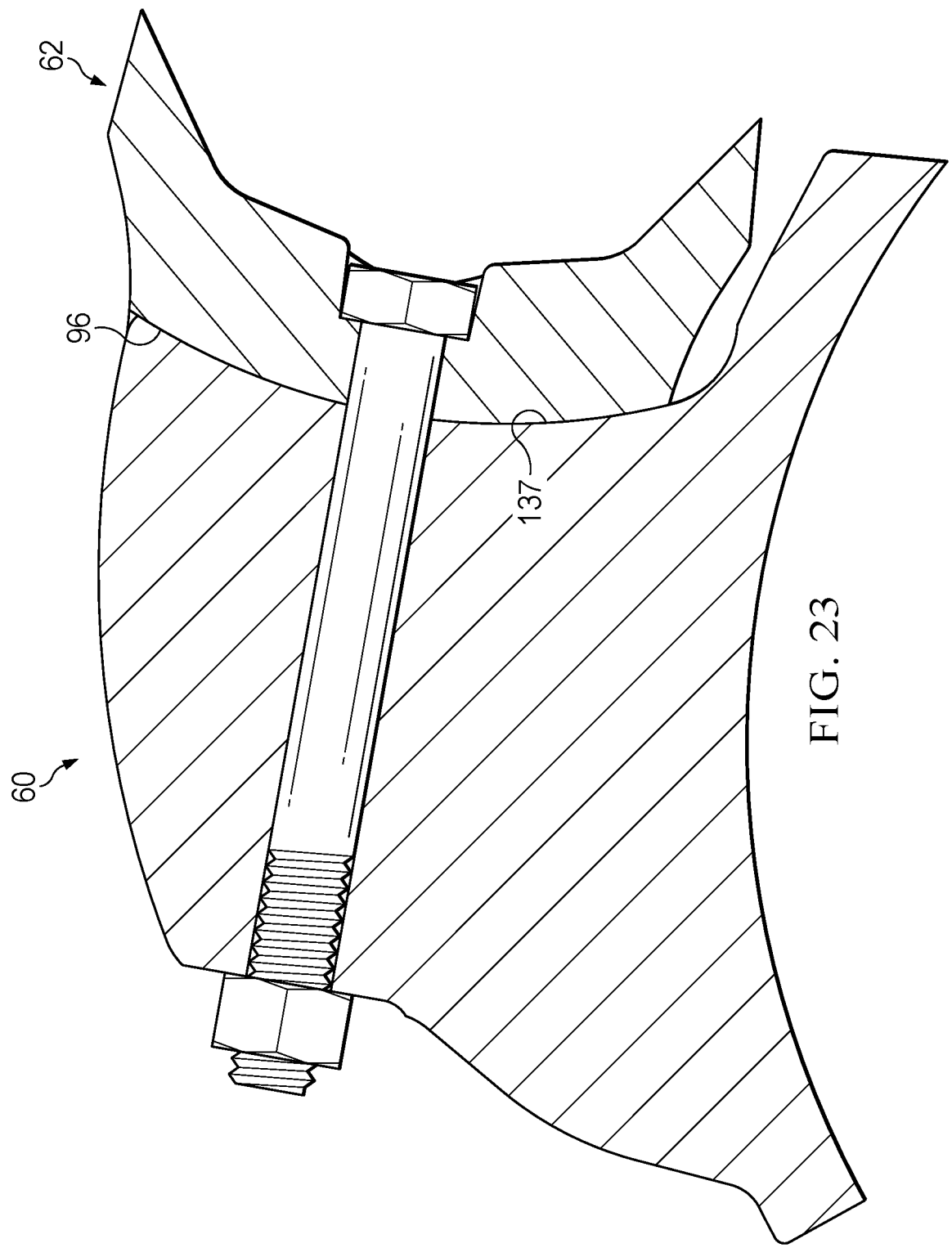
FIG. 23 is a cross sectional view taken along the line 23-23 in FIG. 4.

Referring now to FIG. 23 each of the support surfaces 96, 137 of the tool 62 and the tool holder 60 can be substantially arcuate shaped (when viewed perpendicularly to the imaginary vertical planes P1 and P3). The rear surfaces 110, 114 of the tool 62 and the rear surfaces 142a, 152a, 162a, 172a of the tool holder 60 can also be substantially arcuate shaped. The arcuate shaped surfaces can be complementary to each other and can have a substantially similar radius of curvature. As such, the tool 62 can rotate slightly when seating the cleats 98, 100, 104, 106 in the upper and lower cleat supports 126, 128, 132, 134. In one, embodiment, the radius of curvature of the tool 62 and the tool holder 60 can be between about two inches and about six inches.

During operation of the rotatable drum assembly 36, the arcuate shape of the support surfaces 96, 137 can distribute the resultant force that is imparted to the tool 62 from the feed material more evenly to the tool holder 60 than conventional tool assembly arrangements. In addition, the resultant force from feed material can be more evenly distributed among the interface between the rear and interior stop surfaces 114, 104a of the cleat 104 and the rear and stop surfaces 142a, 144a, respectively, of the upper cleat support 126, between the rear and exterior stop surfaces 114, 106b of the cleat 106 and the rear and stop surfaces 152a, 154a, respectively, of the lower cleat support 128, between the rear and interior stop surfaces 110, 98a of the cleat 98 and the rear and stop surfaces 162a, 164a, respectively, of the upper cleat support 132, and between the rear and exterior stop surfaces 110, 100b of the cleat 100 and the rear and stop surfaces 172a, 174a, respectively, of the lower cleat support 134. As such, the tool assembly 40 can be less susceptible to failure and can be stronger than conventional arrangements while using less material which can be more cost effective and less time consuming to manufacture.

It is to be appreciated that removal of the tool 62 from the tool holder 60 can be achieved by reversing the installation steps outlined above. In some embodiments, the tool 62 can be removed from the tool holder 60 and reinstalled on the tool holder 60 in an inverted orientation. In these embodiments, the tool 62 can be provided in the inverted orientation to allow for use of the other blade 78 when the original blade 78 has worn out, become damaged or is otherwise not suitable for cutting. When the tool 62 is installed on the tool holder 60 in the inverted orientation, the tool 62 can be oriented with the cleats 100, 106 above the cleats 98, 104 such that the first and second sidewalls 90, 92 are to be disposed on the left and right sides 120, 122, respectively, of the tool interface pillar 72. The installation of the tool 62 in this orientation can be similar to the installation method described above except that the cleats 98, 100 interface with the lower and upper cleat supports 128, 126, respectively, on the left side 120 of the tool interface pillar 72 and the cleats 104, 106 interface with the lower and upper cleat supports 134, 132 on the right side 122 of the tool interface pillar 72. For example, when the tool 62 is initially fit onto the front of the tool interface pillar 72, the upper cleat support 126 can be at least partially disposed in the gate 102 of the tool 62, the cleat 100 can be at least partially disposed in the left gate 130 (FIG. 9) of the tool holder 60, the upper cleat support 132 can be at least partially disposed in the gate 108 of the tool 62, and the cleat 106 can be at least partially disposed in the right gate 136 (FIG. 11).

When the tool 62 is interlocked with the tool interface pillar 72, the front, rear and interior stop surfaces 100d, 110, 100a of the cleat 100 can be immediately adjacent, and in some embodiments can contact, the front, rear, and stop surfaces 140a, 142a, 144a, respectively, of the upper cleat support 126. The face surface 100c of the cleat 100 can be immediately adjacent, and in some embodiments can contact, the face surface 148 of the main portion 122. The front, rear and exterior stop surfaces 98d, 110, 98b of the cleat 98 can be immediately adjacent, and in some embodiments can contact, the front, rear, and stop surfaces 150a, 152a, 154a, respectively, of the lower cleat support 128. The face surface 98c of the cleat 98 can be immediately adjacent, and in some embodiments can contact, the face surface 158 of the main portion 122. The front, rear and interior stop surfaces 106d, 114, 106a of the cleat 106 can be immediately adjacent, and in some embodiments can contact, the front, rear, and stop surfaces 160a, 162a, 164a, respectively, of the upper cleat support 132. The face surface 106c of the cleat 106 can be immediately adjacent, and in some embodiments can contact, the face surface 168 of the main portion 122. The front, rear and exterior stop surfaces 104d, 114, 104b of the cleat 104 can be immediately adjacent, and in some embodiments can contact, the front, rear, and stop surfaces 170a, 172a, 174a, respectively, of the lower cleat support 134. The face surface 104c of the cleat 100 can be immediately adjacent, and in some embodiments can contact, the face surface 178 of the main portion 122.

Figure 24:
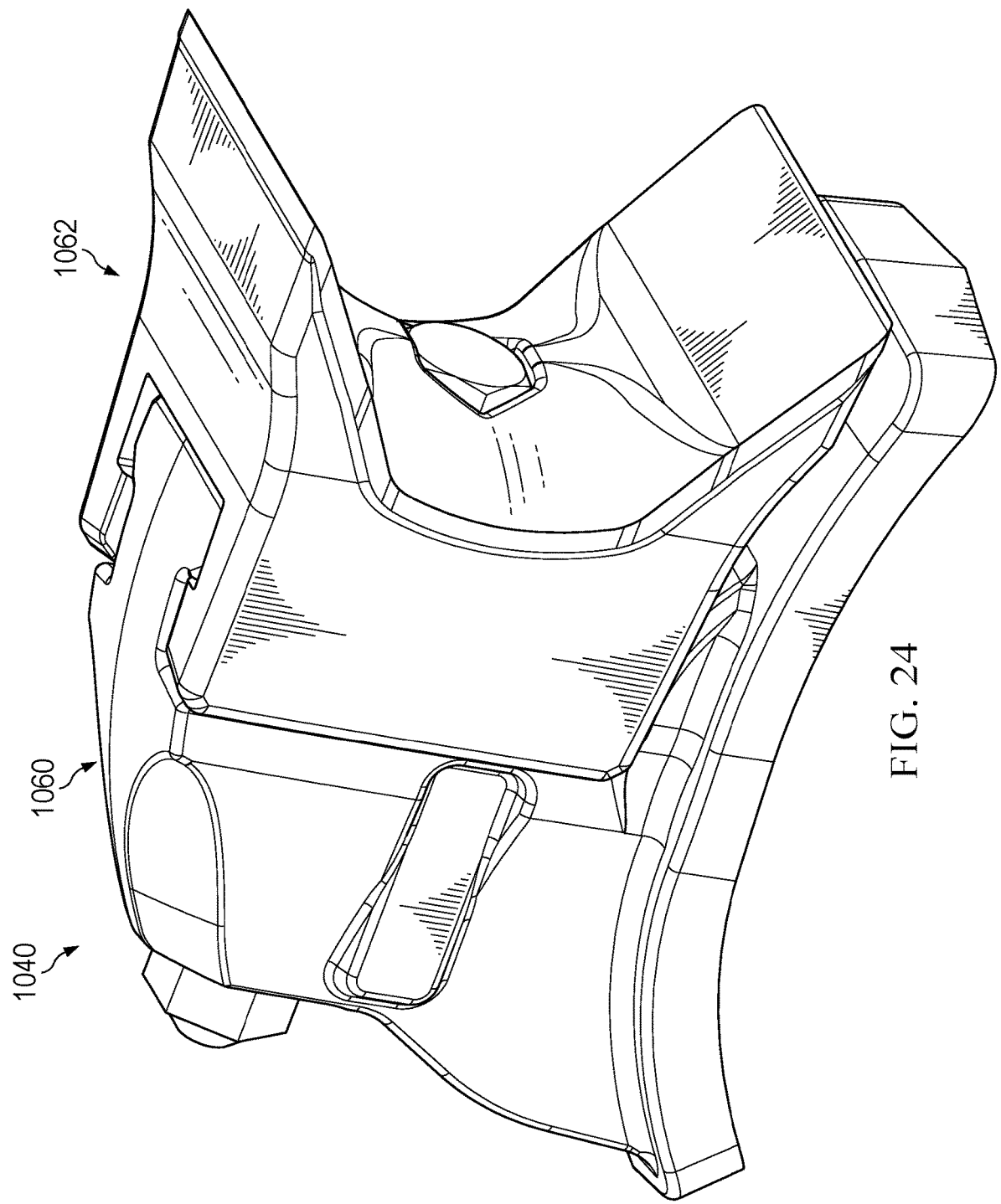
FIG. 24 is a front upper isometric view of a tool assembly having a tool holder and a tool, in accordance with another embodiment.
Figure 25:
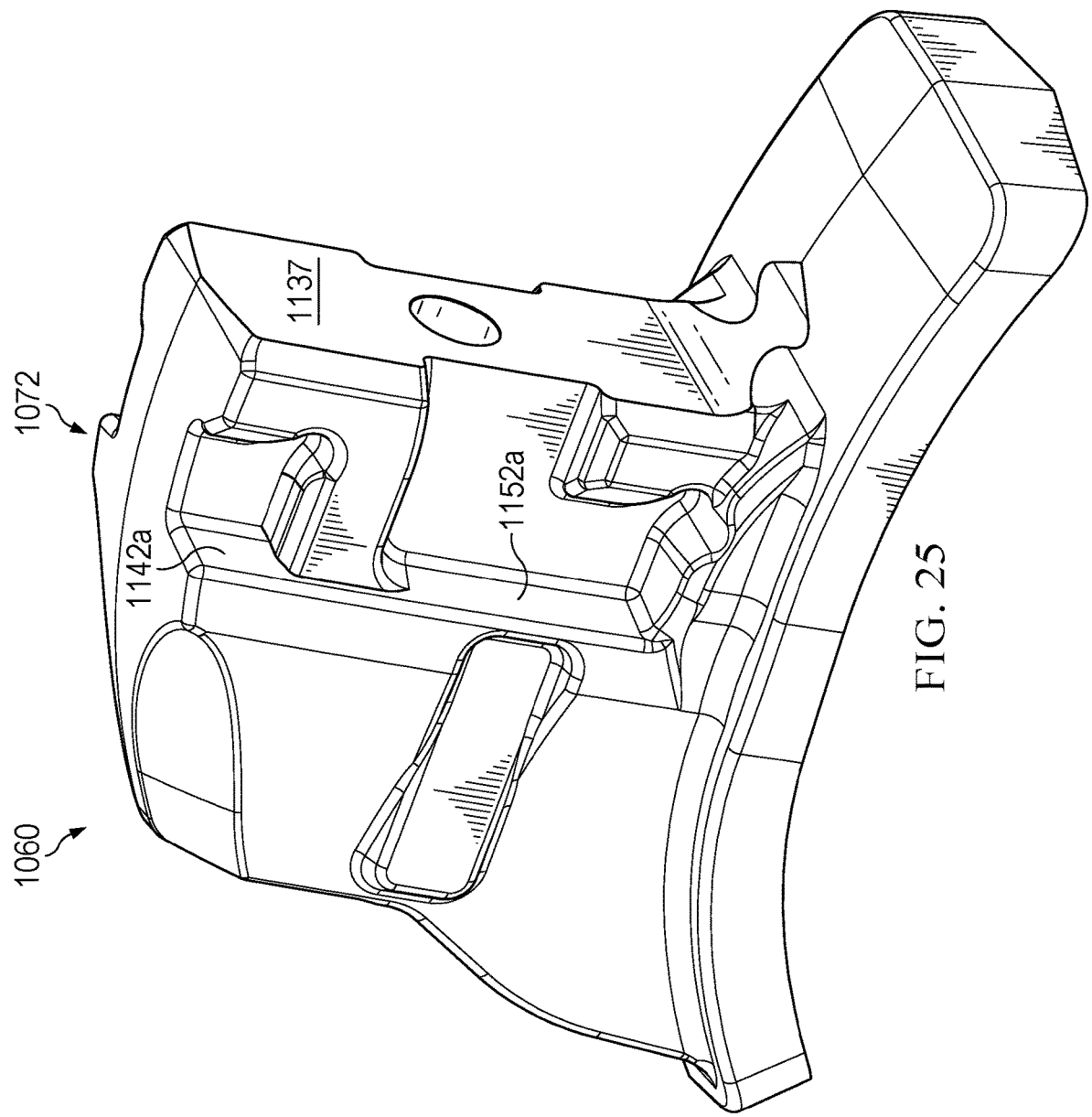
FIG. 25 is a front upper isometric view of the tool holder of FIG. 24.
Figure 26:
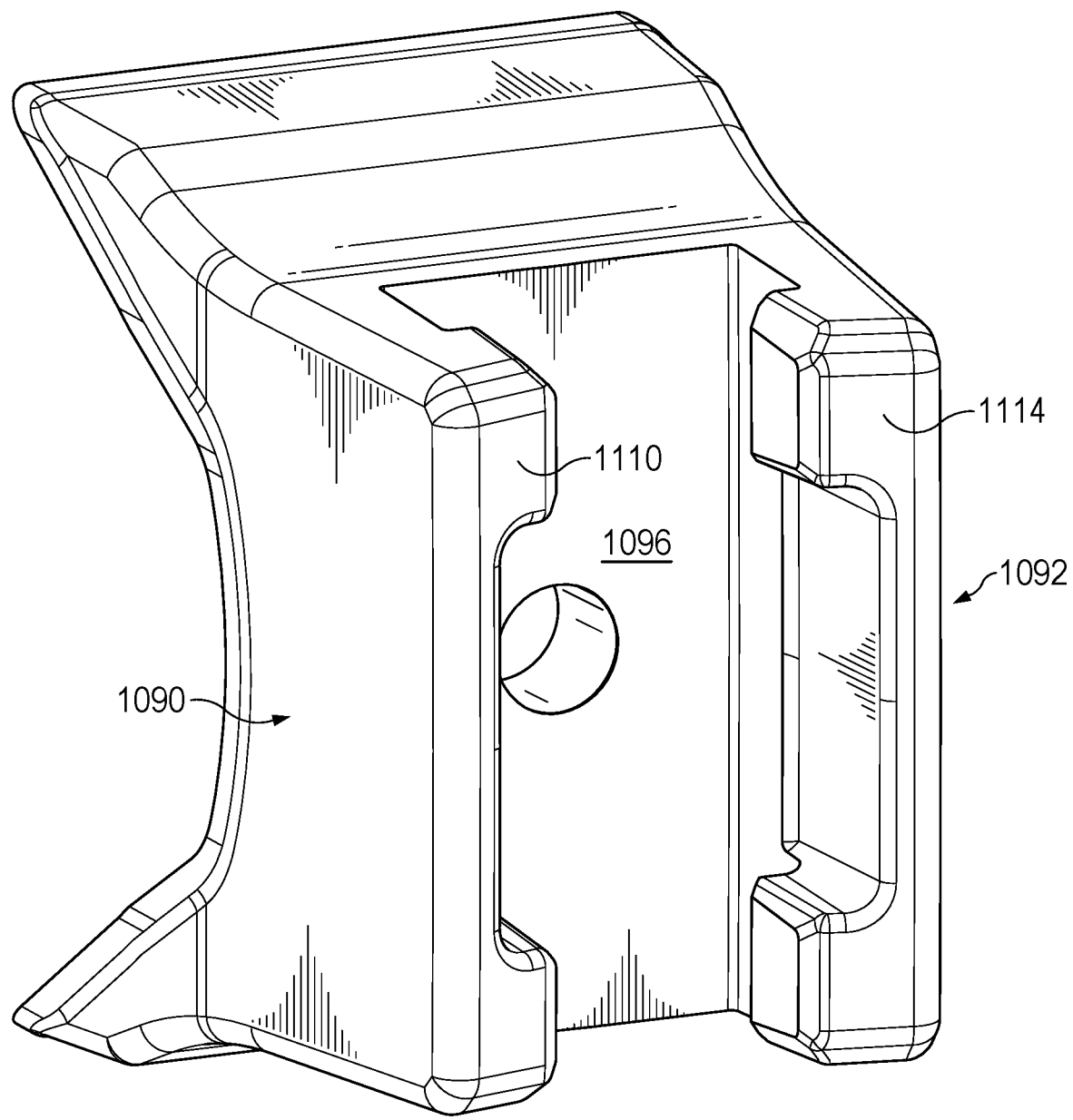
FIG. 26 is a rear upper isometric view of the tool of FIG. 24.

FIGS. 24-26 illustrate an alternative embodiment of a tool assembly 1040 that is similar to, or the same in many respects as the tool assembly 40 illustrated in FIGS. 4-23. For example, as illustrated in FIG. 24, the tool assembly 1040 can include a tool holder 1060 and a tool 1062. As illustrated in FIG. 25, the tool holder 1060 can include a tool interface pillar 1072 that includes a support surface 1137 and a plurality of rear surfaces 1142a, 1152a (two not shown). As illustrated in FIG. 26, the tool 1062 can include a first sidewall 1090, a second sidewall 1092, and a support surface 1096 that extends between the first and second sidewalls 1090, 1092. Rear surfaces 1110, 1114 can be disposed at distal ends of the first and second sidewalls 1090, 1092, respectively. However, the support surfaces 1096, 1137 and the rear surfaces 1110, 1114, 1142a, 1152a can be substantially planar (e.g., non-arcuate).

Figure 27:
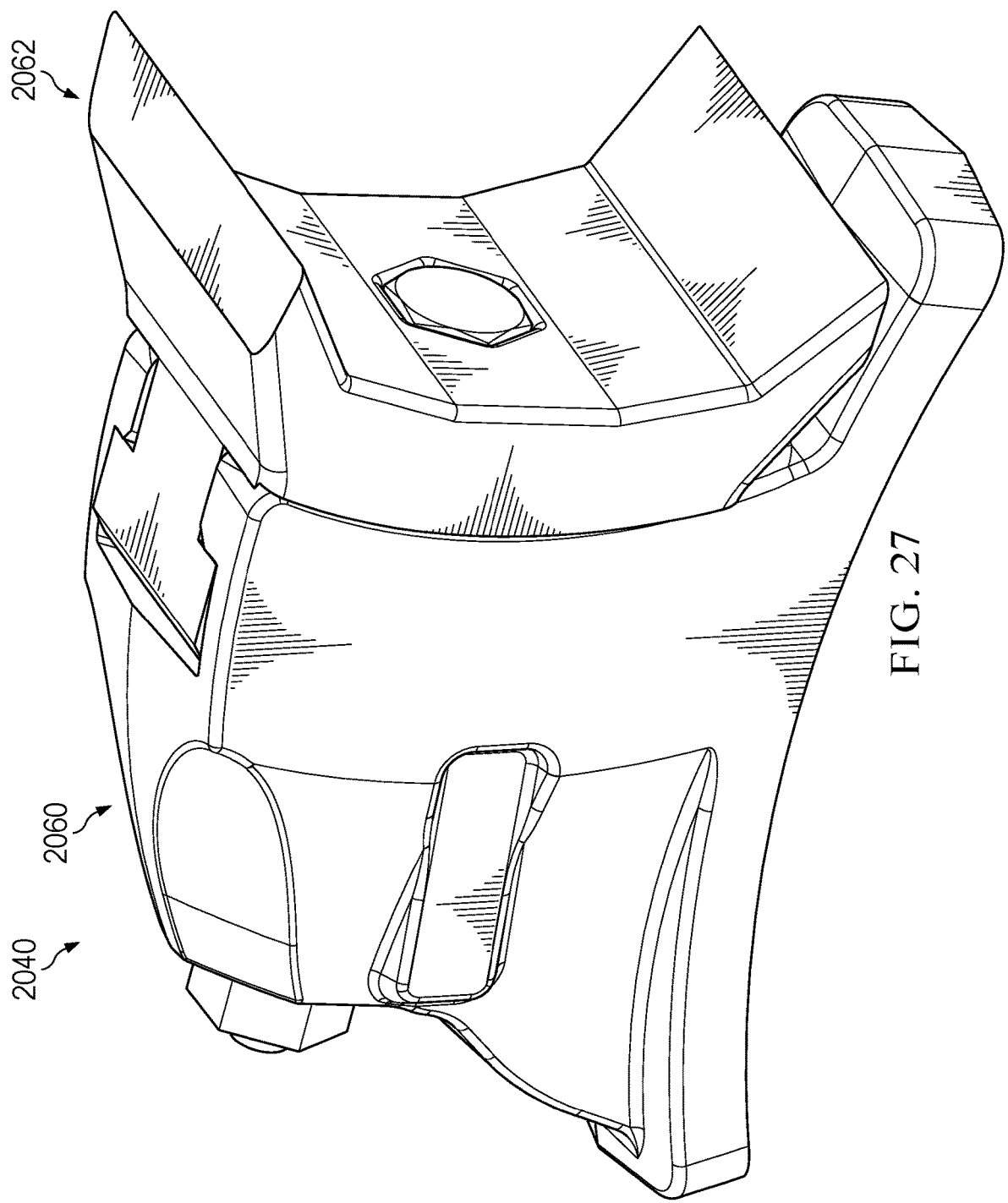
FIG. 27 is a front upper isometric view of a tool assembly having a tool holder and a tool, in accordance with another embodiment.
Figure 28:
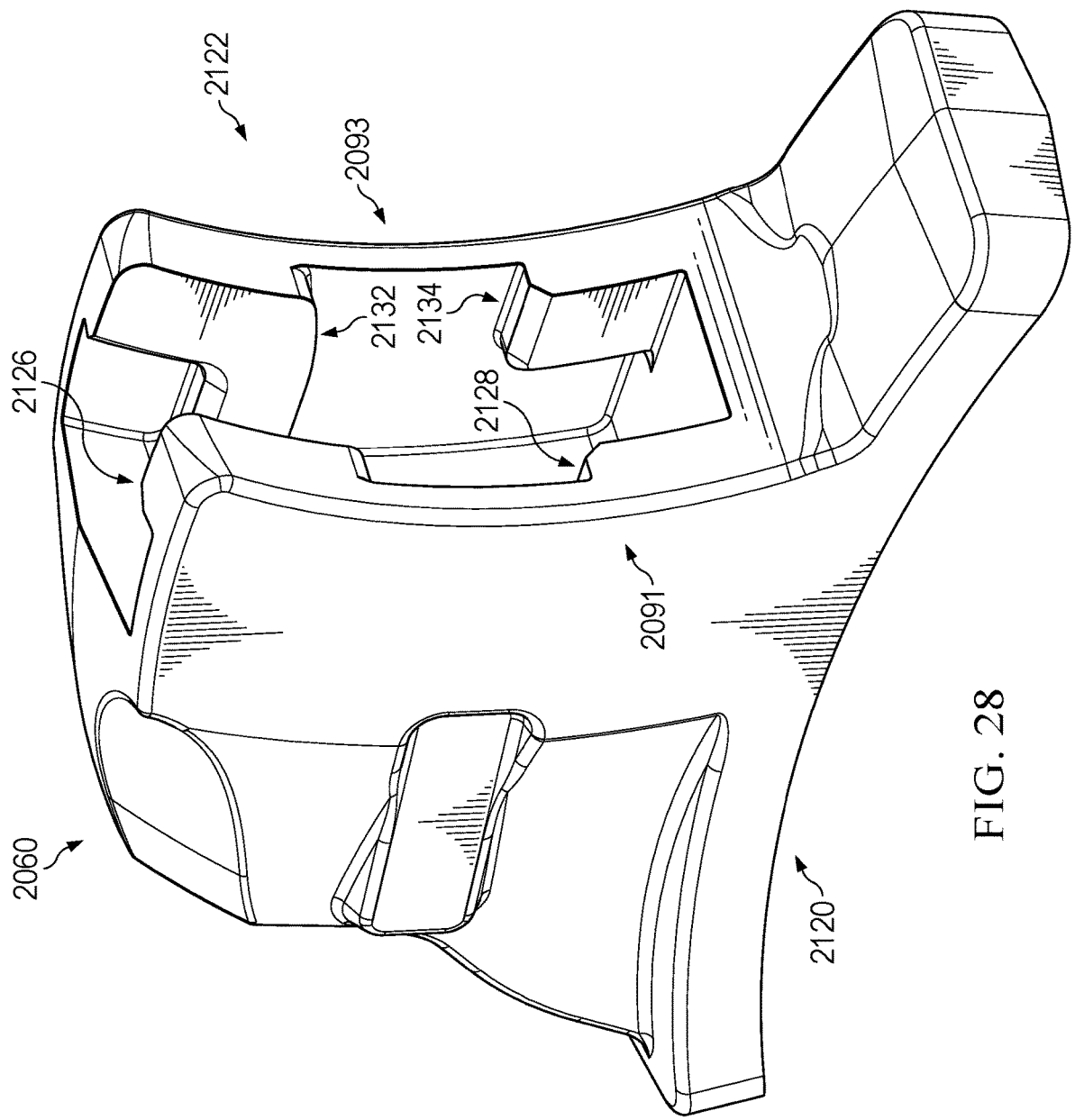
FIG. 28 is a front upper isometric view of the tool holder of FIG. 27.
Figure 29:
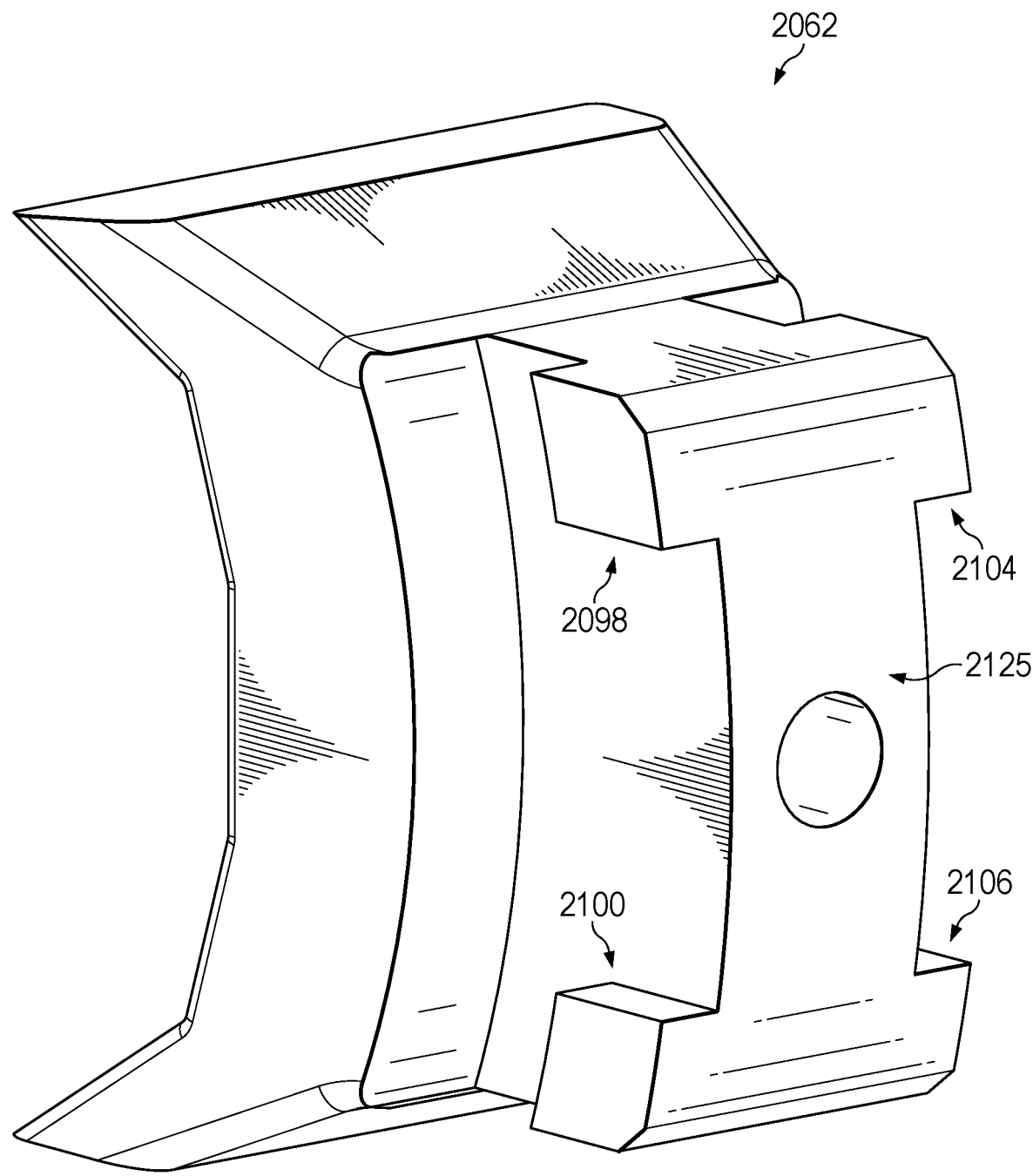
FIG. 29 is a rear upper isometric view of the tool of FIG. 27.

FIGS. 27-29 illustrate an alternative embodiment of a tool assembly 2040 that is similar to, or the same in many respects as the tool assembly 40 illustrated in FIGS. 4-23. For example, as illustrated in FIG. 27, the tool assembly 2040 can include a tool holder 2060 and a tool 2062. As illustrated in FIG. 28, the tool holder 2060 can include upper and lower cleat supports 2126, 2128 disposed on a left side 2120 and upper and lower cleat supports 2132, 2134 disposed on a right side 2122. The cleat supports 2126, 2128, 2132, 2134, however, extend laterally inwardly from opposing sidewalls 2091, 2093. As illustrated in FIG. 29, the tool 2062 can include a cleats 2098, 2100, 2104, 2106 that interface with the cleat supports 2126, 2128, 2132, 2134 to facilitate coupling of the tool 2062 to the tool holder 2060. The cleats 2098, 2100, 2104, 2106, however, extend laterally outwardly from a main portion 2125 of the tool 2062.

Figure 30:
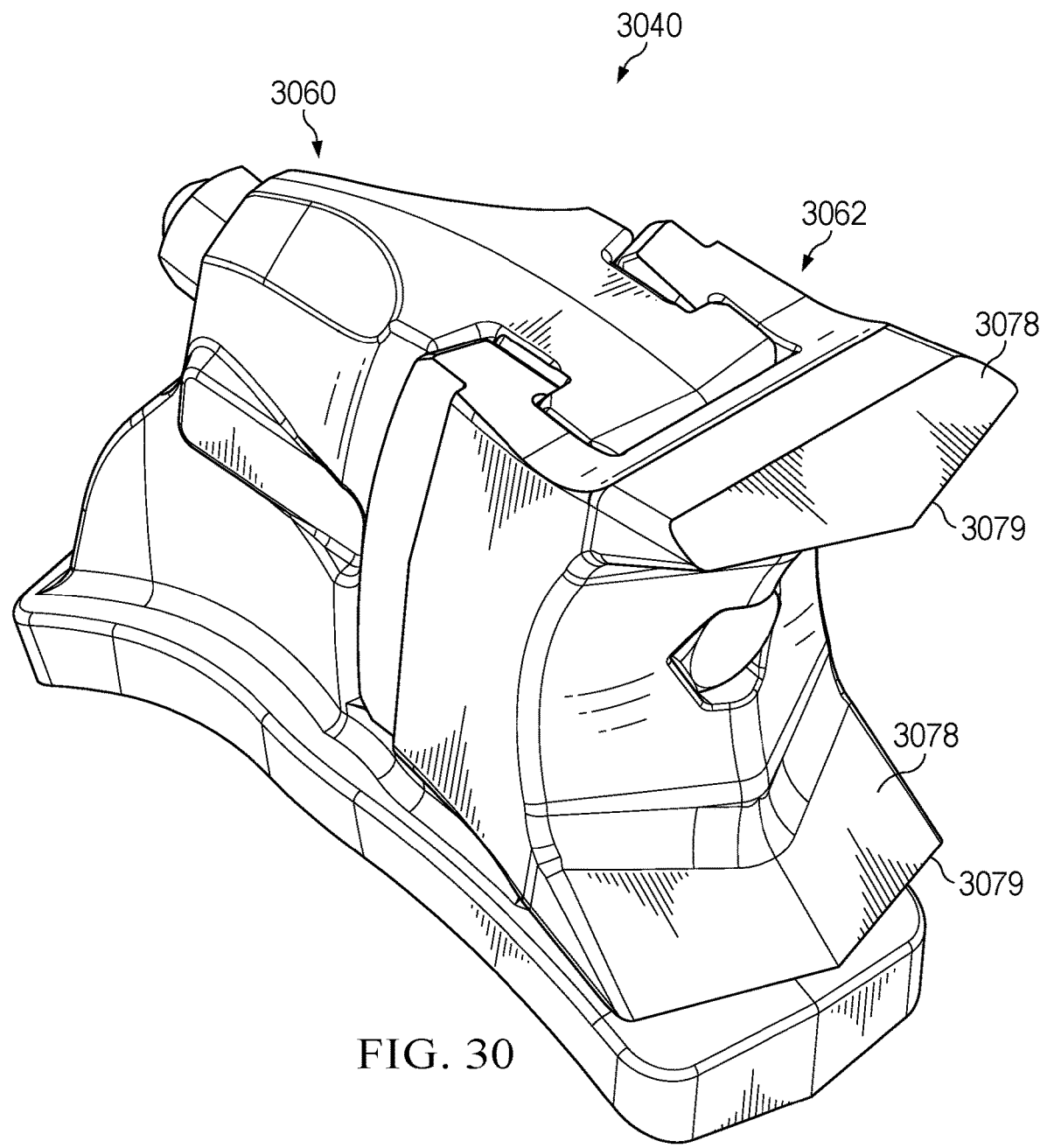
FIG. 30 is a front upper isometric view of a tool assembly having a tool holder and a tool, in accordance with yet another embodiment.

FIG. 30 illustrates another alternative embodiment of a tool assembly 3040 that is similar to, or the same in many respects as the tool assembly 40 illustrated in FIGS. 4-23. For example, the tool assembly 3040 can include a tool holder 3060 and a tool 3062. The tool 3062 can include a pair of blades 3078 that each have a leading edge 3079. The leading edges 3079, however, can be pointed (e.g., in a sword configuration).

Figure 31:
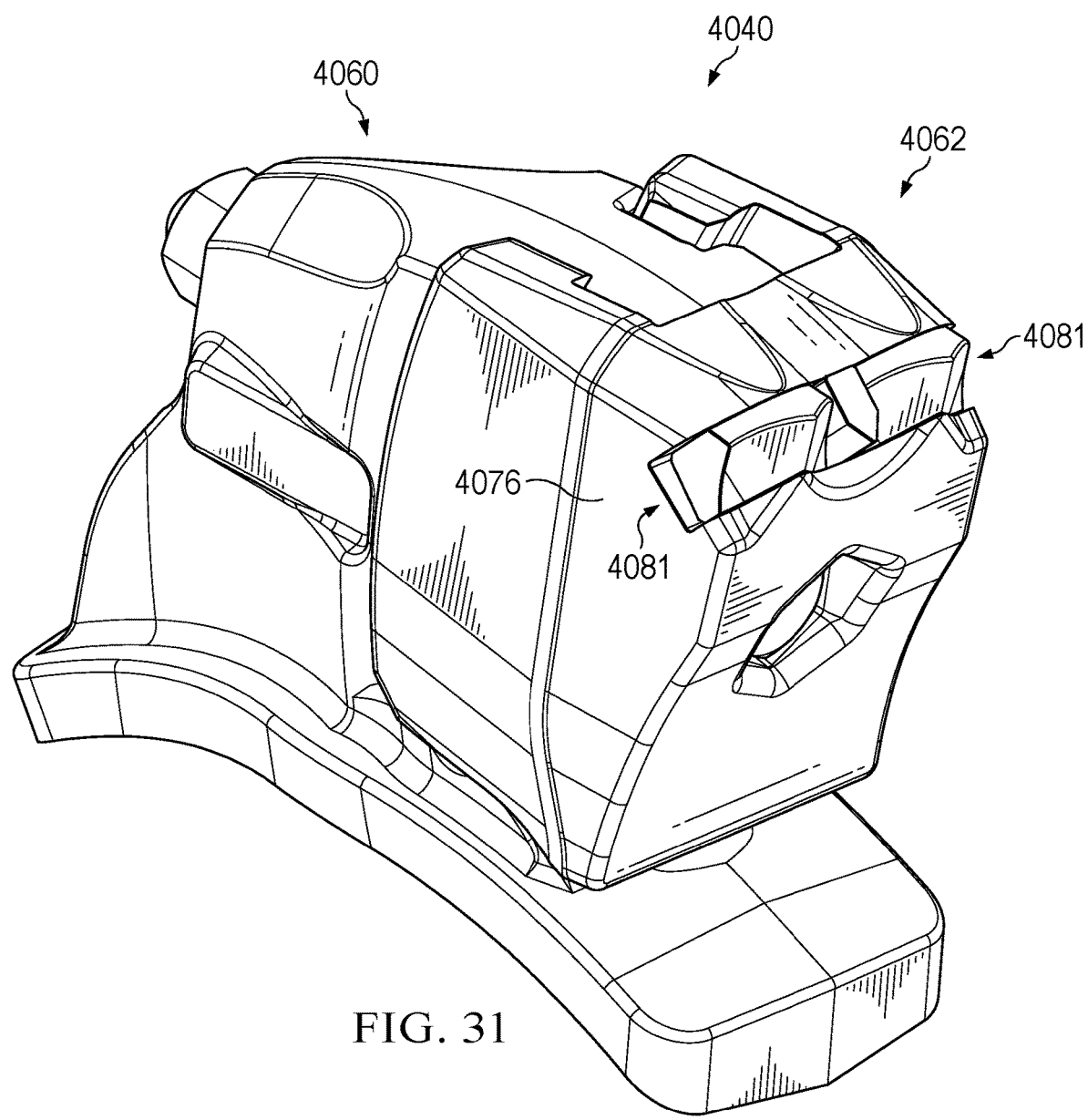
FIG. 31 is a front upper isometric view of a tool assembly having a tool holder and a tool, in accordance with still yet another embodiment.

FIG. 31 illustrates yet another alternative embodiment of a tool assembly 4040 that is similar to, or the same in many respects as the tool assembly 40 illustrated in FIGS. 4-23. For example, the tool assembly 4040 can include a tool holder 4060 and a tool 4062. The tool 4062, however, can include a pair of carbide tips 4081 that are attached to a main body 4076 can include a pair of blades 3076 that each have a leading edge 3077. The leading edges 3077, however, can be pointed (e.g., in a sword configuration).

It is noted that terms like "specifically," "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. It is also noted that terms like "substantially" and "about" are utilized herein to represent the inherent degree of uncertainty that may be attributed to any quantitative comparison, value, measurement, or other representation.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended that the scope be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A tool for a rotary land preparation implement, the tool having a front end and a rear end and comprising:
    a main body defining a centerline that extends between the front end and the rear end;
    at least one material engaging feature disposed at the front end of the tool;
    a first sidewall extending from the rear end;
    a second sidewall extending from the rear end and spaced from the first sidewall;
    a first cleat extending from the first sidewall towards the second sidewall and spaced from the second sidewall; and
    a second cleat extending from the second sidewall towards the first sidewall and spaced from the first sidewall, wherein:
        the main body comprises a support surface that extends between the first sidewall and the second sidewall;
        the first cleat and the second cleat are spaced from the support surface along the centerline such that the support surface is disposed between the first and second cleats and the at least one material engaging feature;
        the first cleat and the second cleat are disposed on opposite sides of the tool;
        the support surface is arcuate in a direction that is perpendicular to the opposite sides; and
        the first cleat and the second cleat cooperate to facilitate retention of the tool to a tool holder.

2. The tool of claim 1 wherein the support surface has a radius of curvature between about two inches and about six inches.

3. The tool of claim 1 wherein the main body defines a passageway that extends between the front end and the rear end and is configured for receiving a fastener.

4. The tool of claim 1 wherein the at least one material engaging feature comprises a pair of blades.

5. The tool of claim 1 further comprising:
    a third cleat extending from the first sidewall towards the second sidewall and spaced from the first cleat and the second sidewall; and
    a fourth cleat extending from the second sidewall towards the first sidewall and spaced from the third cleat and the first sidewall, wherein the first cleat, the second cleat, the third cleat, and the fourth cleat cooperate to facilitate retention of the tool to the tool holder.

6. The tool of claim 5 wherein:
    the first sidewall, the first cleat and the third cleat cooperate to define a first gate therebetween; and
    the second sidewall, the second cleat and the fourth cleat cooperate to define a second gate therebetween.

7. The tool of claim 6 wherein:
    the main body is bisected by an imaginary vertical plane;
    the centerline resides in the imaginary vertical plane; and
    the first cleat, the third cleat, and the first sidewall are disposed on one side of the imaginary vertical plane and the second cleat, the fourth cleat, and the second sidewall are disposed on an opposite side of the imaginary vertical plane.

8. A tool holder for a rotary land preparation implement, the tool holder having a front end and a rear end and comprising:
    a base flange; and
    a main body that extends upwardly from the base flange, the main body comprising:
        a rear portion disposed at the rear end and extending from the base flange; and
        a tool interface pillar disposed at the front end and extending from the rear portion, the tool interface pillar comprising:
            a right side;
            a left side;
            a main portion;
            a left cleat support that extends laterally outwardly from the main portion on the left side of the tool interface pillar and extends from the rear portion towards the front end, the left cleat support cooperating with the main portion and the rear portion to define a left slot that is configured to receive a left cleat of a tool; and
            a right cleat support that extends laterally outwardly from the main portion on the right side of the tool interface pillar and extends from the rear portion towards the front end, the right cleat support cooperating with the main portion and the rear portion to define a right slot that is configured to receive a right cleat of a tool, wherein the rear portion extends upwardly from the left cleat support and the right cleat support.

9. The tool holder of claim 8 wherein:
    the left cleat support comprises:
        a left rear support portion;
        a left front support portion; and
        a left lower support portion that extends between the left rear support portion and the left front support portion such that the left rear support portion, the left front support portion, and the left lower support portion cooperate with the main portion to define the left slot; and the right cleat support comprises:
- a right rear support portion;
- a right front support portion; and
- a right lower support portion that extends between the right rear support portion and the right front support portion such that the right rear support portion, the right front support portion, and the right lower support portion cooperate with the main portion to define the right slot.

10. The tool holder of claim 8 wherein the tool interface pillar comprises an arcuate support surface that is disposed at the front end of the tool holder.

11. The tool holder of claim 10 wherein the arcuate support surface has a radius of curvature that is between about two inches and about six inches.

12. A rotary land preparation implement comprising:
a tool having a front end and a rear end, the tool comprising:
- a main body defining a centerline that extends between the front end and the rear end;
- at least one material engaging feature disposed at the front end of the tool;
- a first sidewall extending from the rear end of the tool;
- a second sidewall extending from the rear end of the tool and spaced from the first sidewall;
- a first cleat extending from the first sidewall towards the second sidewall and spaced from the second sidewall; and
- a second cleat extending from the second sidewall towards the first sidewall and spaced from the first sidewall; and a tool holder having a front end and a rear end and comprising:
- a rear portion disposed at the rear end of the tool holder and extending from the base flange; and
- a tool interface pillar disposed at the front end of the tool holder and extending from the rear portion, the tool interface pillar comprising:
  - a right side;
  - a left side;
  - a main portion;
  - a first cleat support that extends laterally outwardly from the main portion on the left side of the tool interface pillar and extends from the rear portion towards the front end of the tool holder, the first cleat support cooperating with the main portion and the rear portion to define a first slot; and
  - a second cleat support that extends laterally outwardly from the main portion on the right side of the tool interface pillar and extends from the rear portion towards the front end of the tool holder, the second cleat support cooperating with the main portion and the rear portion to define a second slot, wherein:

the main body comprises a support surface that extends between the first sidewall and the second sidewall;

the first cleat and the second cleat are spaced from the support surface along the centerline such that the support surface is disposed between the first and second cleats and the at least one material engaging feature;

the first cleat and the second cleat are disposed on opposite sides of the tool;

the support surface is arcuate in a direction that is perpendicular to the opposite sides; and the first cleat and the second cleat selectively interface with the first cleat support and the second cleat support, respectively, to facilitate selective coupling of the tool to the tool holder.

13. The rotary land preparation implement holder of claim 12 wherein the tool interface pillar comprises an arcuate support surface that is disposed at the front end of the tool holder.

14. The rotary land preparation implement holder of claim 13 wherein the arcuate support and the support surface each have a radius of curvature that is substantially the same.

15. The rotary land preparation implement holder of claim 14 wherein the radius of curvature of each of the arcuate support surfaces is between about two inches and about six inches.

16. The rotary land preparation implement of claim 12 wherein the at least one material engaging feature comprises a pair of blades.

17. The rotary land preparation implement holder of claim 12 wherein:
the first cleat support comprises:
- a first rear support portion;
- a first front support portion; and
- a first lower support portion that extends between the first rear support portion and the first front support portion such that the first rear support portion, the first front support portion, and the first lower support portion cooperate with the main portion to define the first slot; and the second cleat support comprises:
- a second rear support portion;
- a second front support portion; and
- a second lower support portion that extends between the second rear support portion and the second front support portion such that the second rear support portion, the second front support portion, and the second lower support portion cooperate with the main portion to define the second slot.

18. A vehicle in combination with the rotary land preparation implement of claim 12.

* * * * *

UNITED STATES PATENT AND TRADEMARK OFFICE
CERTIFICATE OF CORRECTION

PATENT NO. : 11,871,689 B1
APPLICATION NO. : 18/178439
DATED : January 16, 2024
INVENTOR(S) : Tyler Rand Smith It is certified that error appears in the above-identified patent and that said Letters Patent is hereby corrected as shown below:

In the Claims

Claim 14 should be amended as follows:
14. The rotary land preparation implement holder of claim 13 wherein the arcuate support surface and the support surface each have a radius of curvature that is substantially the same.

Claim 15 should be amended as follows:
15. The rotary land preparation implement holder of claim 14 wherein the radius of curvature of each of the arcuate support surface and the support surface is between about two inches and about six inches.

Signed and Sealed this
Thirtieth Day of April, 2024

Katherine Kelly Vidal
*Director of the United States Patent and Trademark Office*